United States Patent
Iwamatsu et al.

(10) Patent No.: US 7,477,442 B2
(45) Date of Patent: Jan. 13, 2009

(54) DISPLAY APPARATUS AND METHOD FOR PRODUCING THE SAME

(75) Inventors: Tadashi Iwamatsu, Nara (JP); Hiroyuki Hirakawa, Nara (JP); Nobuyuki Azuma, Osaka (JP); Yoshinori Mutou, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 13 days.

(21) Appl. No.: 10/586,808

(22) PCT Filed: Jan. 21, 2004

(86) PCT No.: PCT/JP2004/000451

§ 371 (c)(1), (2), (4) Date: Jul. 21, 2006

(87) PCT Pub. No.: WO2005/000451

PCT Pub. Date: Aug. 4, 2005

(65) Prior Publication Data

US 2007/0206270 A1 Sep. 6, 2007

(51) Int. Cl.
G02B 26/00 (2006.01)
G02B 26/02 (2006.01)
G09G 3/34 (2006.01)

(52) U.S. Cl. .............. 359/296; 359/228; 345/107; 345/84; 345/87; 349/112; 349/149

(58) Field of Classification Search .......... 359/296, 359/245, 228, 452; 345/106, 107, 55, 48, 345/71, 84–89, 173; 349/12, 112–114, 117, 349/42, 86, 106, 138, 141, 43, 130, 149, 349/153, 152; 257/499, 501, 508
See application file for complete search history.

(56) References Cited

U.S. PATENT DOCUMENTS

| 4,419,663 | A | * | 12/1983 | Kohashi | 345/107 |
| 5,956,005 | A | * | 9/1999 | Sheridon | 345/84 |
| 6,680,517 | B2 | * | 1/2004 | Namba | 257/499 |
| 6,816,303 | B2 | * | 11/2004 | Ukigaya | 359/296 |
| 6,862,016 | B2 | * | 3/2005 | Matsuura et al. | 345/107 |

(Continued)

FOREIGN PATENT DOCUMENTS

JP 50-15115 6/1975

(Continued)

*Primary Examiner*—Loha Ben
(74) *Attorney, Agent, or Firm*—Edwards Angell Palmer & Dodge, LLP; David G. Conlin; William J. Daley, Jr.

(57) ABSTRACT

A large number of holes are formed in a two-layered porous film sandwiched between a lower substrate and an upper substrate and filled with a light transmitting liquid and fine particles. When a voltage is applied between an upper electrode and a lower electrode, migration of the fine particles, takes place based on electrophoresis. White color is displayed when the fine particles are located on an upper transparent porous film side and black color is displayed when the fine particles are located on a lower black porous film side. Color display is also possible by periodically repeating three primary colors of RGB in the lower layer porous film or arranging a color filter on the transparent upper substrate. Bubbles-containing fine particles or bubbles themselves may be employed in place of the fine particles.

24 Claims, 13 Drawing Sheets

U.S. PATENT DOCUMENTS

| | | | |
|---|---|---|---|
| 6,922,275 B2 * | 7/2005 | Ikeda | 359/296 |
| 7,292,222 B2 * | 11/2007 | Ahn et al. | 345/107 |
| 2003/0025985 A1 | 2/2003 | Katase | |
| 2004/0085618 A1 | 5/2004 | Kawai | |
| 2005/0078241 A1 * | 4/2005 | Lee et al. | 349/112 |

FOREIGN PATENT DOCUMENTS

| | | |
|---|---|---|
| JP | 55-069126 | 5/1980 |
| JP | 55-70820 | 5/1980 |
| JP | 57-016423 | 1/1982 |
| JP | 61-34648 | 8/1986 |
| JP | 61-275717 | 12/1986 |
| JP | 64-086116 | 3/1989 |
| JP | 2001-255836 | 9/2001 |
| JP | 2001-282143 | 10/2001 |
| JP | 2002-244163 | 8/2002 |
| JP | 2003-107535 | 4/2003 |
| JP | 2003-241232 | 8/2003 |
| JP | 2003-255403 | 9/2003 |
| JP | 2003-330049 | 11/2003 |
| JP | 2004-004714 | 1/2004 |

* cited by examiner

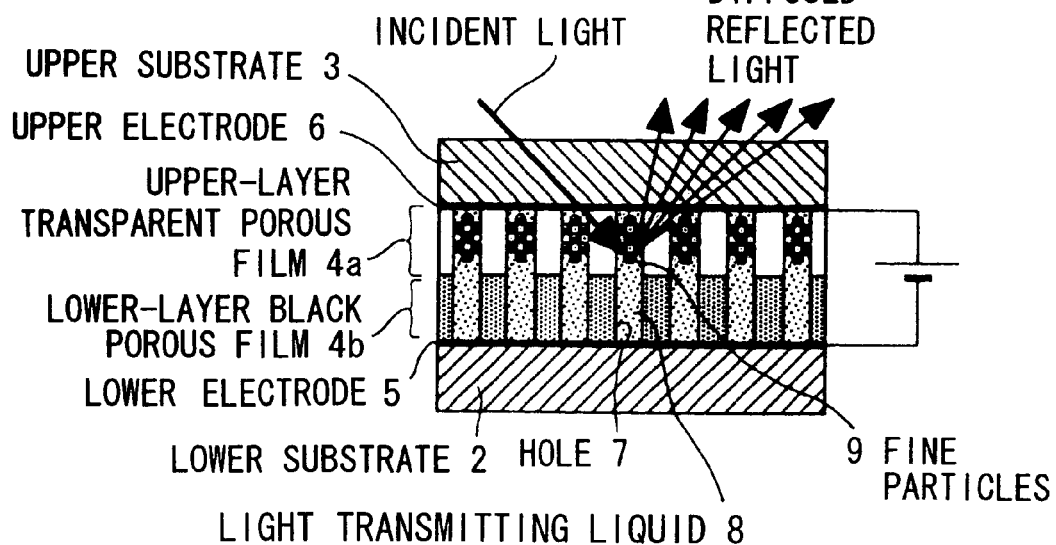
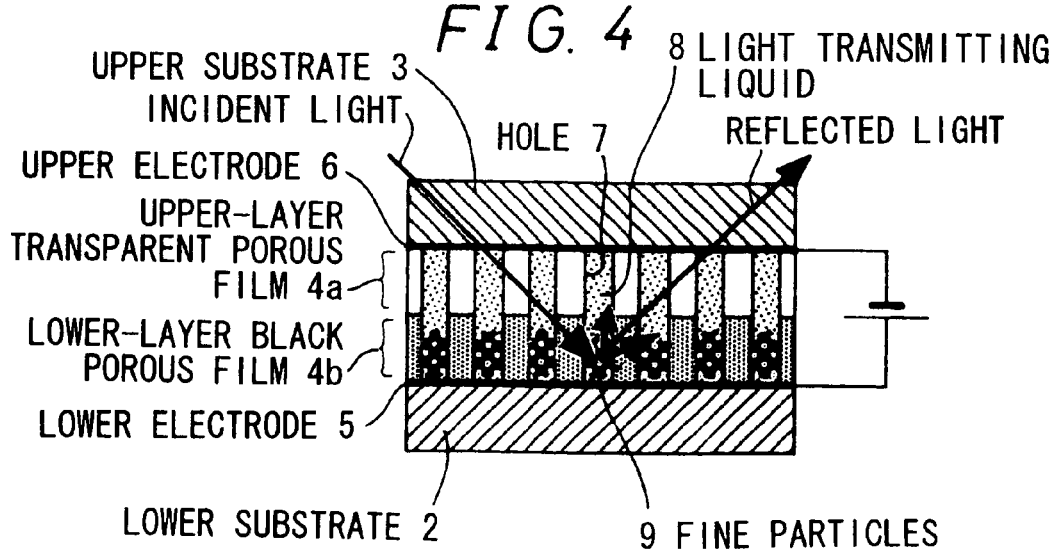

DISPLAY APPARATUS AND METHOD FOR PRODUCING THE SAME

This application is a National Stage Filing of PCT Application No. PGT/JP04/000451, filed Jan. 21, 2004, the teachings of which are incorporated herein by reference.

TECHNICAL FIELD

The present invention relates to a thin-sheet display apparatus, especially to a thin display apparatus utilizing electrokinetic phenomena.

BACKGROUND ART

Heretofore, applying electrokinetic phenomena such as electrophoresis and electroosmosis to displays has been proposed. Regarding an electrophoretic display, a basic concept thereof has been proposed first in Japanese Examined Patent Publication JP-B2 50-15115 (1975), in which the position of fine particles dispersed in an insulating dispersion is kept under field control to thereby vary the optical reflectivity characteristic of a display apparatus. In Japanese Unexamined Patent Publication JP-A 64-86116 (1989), a technique of sealing up a large number of the open pores of a meshed or porous, open-pored spacer with an electrophoretic particles-containing dispersion has been introduced as a related art, and a method of encapsulating the dispersion in microcapsules has been proposed.

Apart from this, an electroosmotic display is disclosed in Japanese Examined Patent Publication JP-B2 61-34648 (1986). Herein, proposed is a method of controlling the rate of liquid impregnation into a porous material through electroosmosis to thereby obtain a contrast of a display apparatus.

The display apparatus disclosed in JP-B2 50-15115 has an essential problem relating to the life thereof in that the characteristics of the apparatus may be deteriorated owing to the aggregation or sedimentation of the particles in the dispersion. The display apparatus disclosed in JP-A 64-86116 may be improved in point of the problem of aggregation or sedimentation of the particles, but its problem to be solved in point of the life and the driving voltage thereof still remains unsolved. The electroosmotic system disclosed in JP-B2 61-34648 has some problems to be solved in point of the liquid evaporation, the contrast insufficiency, the complicated apparatus structure and the uniformity, and cannot as yet be put into practical use.

DISCLOSURE OF THE INVENTION

An object of the invention is to solve the problems with the electrophoretic displays and the electroosmotic displays mentioned above, and to provide a display apparatus of utilizing electrokinetic phenomena which has a simpler structure and may move stably.

The invention provides a display apparatus comprising:

a sheet-form porous body which has plural holes dispersively formed to run through in a thickness direction thereof and has at least a light transmitting part to change its optical property in the thickness direction;

a liquid filled in each of the holes of the porous body, which has a light transmitting part and a part differing from the light transmitting part in optical property, the part differing in optical property being capable of changing its position in the thickness direction through voltage application thereto;

a pair of substrates of which at least one is transmissive of light and which hold the porous body on both sides thereof in the thickness direction so as to seal up the holes each filled with the liquid;

a transparent electrode disposed on one side of the pair of substrates; and a counter electrode disposed on the other side of the pair of substrates, which enables electric field application to the liquid in the holes with the transparent electrode.

According to the invention, the display apparatus comprises a porous body, a liquid, a pair of substrates, a transparent electrode and a counter electrode. The porous body has a form of sheet, and has plural holes dispersively formed to run through the thickness direction thereof; and each hole is filled with a liquid which has a light transmitting part and a part differing from the light transmitting part in optical property, and in which the part differing in optical property may change its position in the thickness direction through voltage application thereto. The pair of substrates holds the porous body on both sides thereof in the thickness direction so as to seal up the holes each filled with the liquid, and at least one of them is transmissive of light. The porous body has at least a light transmitting part to change its optical property in the thickness direction thereof. When a voltage is applied between the transparent electrode disposed on one side of the substrates and the counter electrode disposed on the other side of the substrates, then the liquid filled in the holes of the porous body may change the position of its part differing in optical property in the thickness direction. The porous body has at least a light transmitting part to change its optical property in the thickness direction thereof, and therefore when the position of the part of the liquid differing in optical property changes, then the combination between the optical property of the porous body around the holes and the optical property of the liquid in the holes varies, thereby bringing about visual changes to attain displaying. The liquid is separately filled in each hole sealed up by such a simple structure that the porous body is sandwiched between a pair of substrates, and therefore the liquid is sealed up in such small spaces and is not lost by evaporation, and is prevented from being oxidized or absorbing moisture, therefore enabling stable display operation.

In the invention, the part of the liquid differing in optical property comprises fine particles dispersed in the liquid serving as a dispersant.

According to the invention, the fine particles dispersed in the liquid columns filled in the holes of the porous body are solid, and electrochemical interaction occurs in the interface between the solid and the liquid, thereby electrically charging the surface. In the liquid around the fine particles, formed is an electric double layer, and a slide face occurs inside the electric double layer through field application thereto, whereby the fine particles move through electrophoresis. The optical property of the part where the fine particles exist differs from that of the part where they do not exist, and therefore the field-dependent movement of the fine particles brings about displaying. Since the structure of the apparatus is such that the liquid and the fine particles are sealed up inside the porous body, the fine particles and the liquid may be sealed up in small spaces in such an extremely simple structure, therefore evading the problem of aggregation of the fine particles.

In the invention, the fine particles are formed of a light transmitting material internally containing at least one bubble.

According to the invention, the light transmitting material internally contains at least one bubble, and therefore, when the porous body near the position at which the bubbles-containing fine particles are positioned is transmissive of light in point of its optical property, then the incident light thereinto may irregularly reflect and/or irregularly refract owing to the refractivity difference at the interface between the light transmitting material and the bubbles, and the apparatus may be thereby bright; but when the porous body near the position is not transmissive of light, then the apparatus may be dark to attain displaying. Since the bubbles are internally added to the solid transparent material, they may be stably kept in the apparatus.

In the invention, the part of the liquid differing in optical property comprises bubbles contained in the liquid.

According to the invention, a voltage may be applied between the transparent electrode and the counter electrode to generate electroosmotic currents of the liquid inside the holes of the porous body, thereby controlling the position of the bubbles. At the interface between the liquid and the bubbles, light undergoes irregular reflection and/or irregular refraction, and therefore when the porous body near the position of the bubbles is transmissive of light in point of its optical property, then the apparatus may be bright; but when the porous body near the position of the bubbles is not transmissive of light, then the apparatus may be dark to attain displaying. Since the apparatus is so constructed that the bubbles-containing liquid and the fine particles are sealed up inside the porous body, the bubbles and the liquid may be sealed up in such small spaces in an extremely simple structure, and therefore the apparatus may evade the problem of liquid evaporation and its life may be prolonged.

In the invention, the porous body has a colored part at least partly in the thickness direction thereof, and when the position of the fine particles or the bubbles is set under field control so as to meet the position of the colored part, then the incident light to the light transmitting part is absorbed by the colored part, whereby the reflected light expresses coloration.

According to the invention, when the apparatus is set under voltage control so that the fine particles and the bubbles in the liquid inside the holes can be positioned at the colored part of the porous body, then the colored light reflection may be changed to attain color displaying.

In the invention, the fine particles are white fine particles, and when the position of the white fine particles is set under field control so as to meet the light transmitting part of the porous body, then the incident light to the light transmitting part is irregularly reflected on the surfaces of the white fine particles, whereby the reflected light expresses white.

According to the invention, the incident light to the holes via the light transmitting part of the porous body is irregularly reflected on the surfaces of the white fine particles When the white fine particles are not positioned in the light transmitting part, then the irregular reflection does not occur, and therefore the presence or absence of white displaying may be controlled by voltage application and a good contrast may be thereby expressed.

In the invention, when the position of the fine particles of the bubbles-containing light transmitting material or the position of the bubbles is set under field control so as to meet the light transmitting part of the porous body, then the optical path of the incident light to the light transmitting part is changed owing to the refractivity difference from the light transmitting material or the liquid at the interface of the bubbles, whereby the reflected light expresses white.

According to the invention, the incident light to the holes via the light transmitting part of the porous body undergoes irregular reflection/irregular refraction on the surfaces of the bubbles owing to the refractivity difference at the interface of the bubbles, thereby displaying white. In case where bubbles or bubbles-containing fine particles are not positioned in the light transmitting part, then neither irregular reflection nor irregular refraction occurs, and therefore the presence or absence of white displaying may be controlled by voltage application and a good contrast may be thereby expressed.

In the invention, the refractive index of the light transmitting part of the porous body is equivalent to that of the light transmitting part of the liquid or to that of the light transmitting material of the bubbles-containing fine particles, and the refractive index is at least 1.3.

According to the invention, the refractive index of the light transmitting part of the porous body and the liquid, and that of the light transmitting material of the bubbles-containing fine particles are equivalent to each other, and therefore the light reflection and refraction at these interfaces may be reduced. Since the refractive index is at least 1.3, the range of the incident angle for total reflection at the interface to the fine particles or bubbles in the liquid may be broadened, and the display contrast may be thereby increased.

In the invention, the porous body comprises two layers composed of a light transmitting layer in contact with one of the substrates and a colored layer in contact with the other of the substrates.

According to the invention, the porous body may be produced by bonding a transparent synthetic resin film or glass plate and a colored synthetic resin film or glass plate followed by forming a large number of through-holes in the resulting structure.

In the invention, the holes formed in the porous body have a cylindrical form, running through the body from the surface of the light transmitting layer to the surface of the colored layer.

According to the invention, cylindrical micro-through-holes may be uniformly formed according to a method wherein the light transmitting layer and the colored layer are kept bonded together with no hole formed therethrough, and a large number of micro-holes are formed through them by irradiation with ionic beams, and then they are chemically etched.

In the invention, a mean diameter of the cylindrical form is at most 100 μm.

According to the invention, since the cylindrical holes formed in the porous body have a mean diameter of at most 100 μm, a large number of such holes may exist in a region that can be recognized as one pixel by human eyesight, therefore preventing a granular feeling of images to be caused by the porous form of the body.

In the invention, the colored layer of the porous body has a colored pattern of at least three periodically-repeating colors.

According to the invention, for example, color displaying may be attained by micro-displaying of three colors of red R, green G and blue B.

In the invention, a mean diameter of the plural holes formed in the porous body is smaller than the thickness of the porous body.

According to the invention, since the mean diameter of the holes formed in the porous body is smaller than the thickness of the porous body, the size of the fine particles and the bubbles in the liquid filled in the holes is smaller than the thickness of the porous body, and therefore the difference in the optical property in the thickness direction of the porous body may be reflected in displaying through voltage control for the position of the fine particles and the bubbles.

In the invention, the liquid to be filled in each hole of the porous body contains a plurality of the fine particles or the bubbles.

According to the invention, since the liquid to be filled in each hole of the porous body contains a plurality of the fine particles or the bubbles, the reflection and/or refraction of the fine particles or the bubbles therebetween may increase the intensity and absorption of the scattered reflected light, whereby the difference in the optical property in the thickness direction of the porous body may be more definitely reflected in displaying images of good contrast.

In the invention, the porous body and the pair of substrates contain an organic compound, the transparent electrode and the counter electrode contain an electroconductive polymer, and the apparatus is flexible as a whole.

According to the invention, since the display apparatus comprising a porous body, substrates on both sides thereof, a transparent electrode and a counter electrode is flexible as a whole, it is possible to handle the display apparatus like flexible and paper-made documents.

In the invention, the light transmitting substrate on one side of the porous body is provided with a color filter.

According to the invention, since the light transmitting substrate disposed on one side of the porous body is provided with a color filter, the light-scattering in the porous body may be controlled in accordance with the position of the individual color of the color filter for displaying a color image as a whole.

BRIEF DESCRIPTION OF DRAWINGS

Other and further objects, features, and advantages of the invention will be more explicit from the following detailed description taken with reference to the drawings wherein:

FIG. 3 is a view showing a method for voltage application to display a white image in a display apparatus 1 shown in FIG. 1;

FIG. 4 is a view showing a method for voltage application to display a black image in a display apparatus 1 shown in FIG. 1;

BEST MODE FOR CARRYING OUT THE INVENTION

Figure 1:
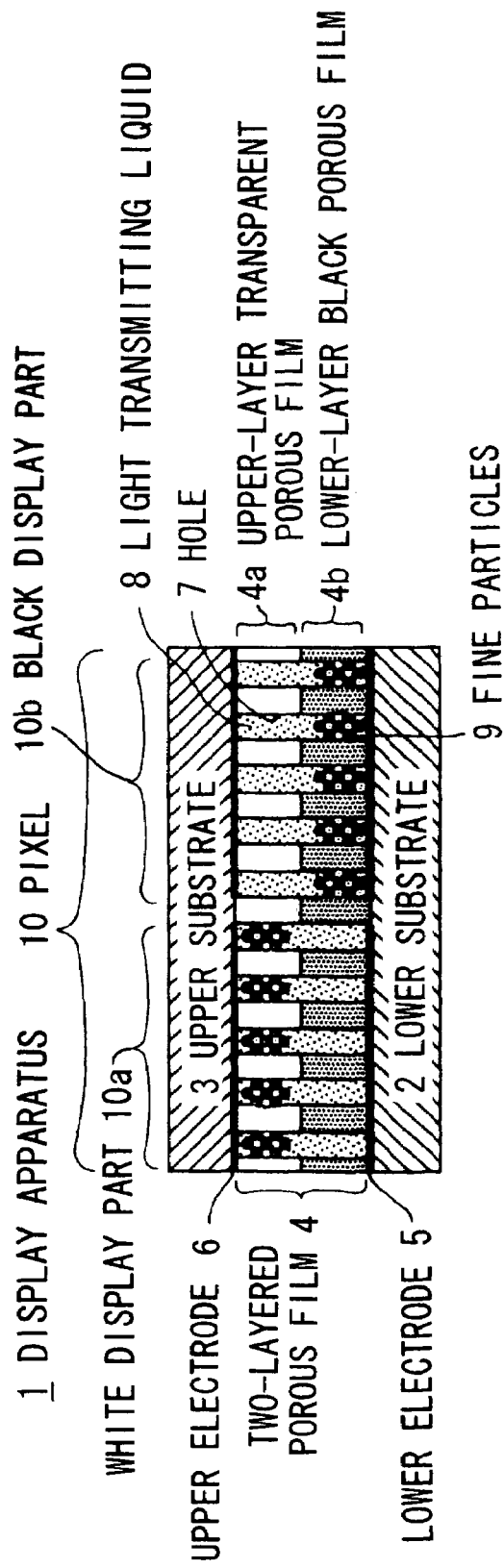
FIG. 1 a view graphically showing a cross-sectional structure in a thickness direction of a part of a display apparatus 1 according to a first embodiment of the invention.

Now referring to the drawings, preferred embodiments of the invention are described below.

FIG. 1 graphically shows a cross-sectional structure in the thickness direction of a part of a display apparatus 1 according to a first embodiment of the invention. The display apparatus 1 of this embodiment has a structure in which a porous body, a two-layered porous film 4 is sandwiched between a lower substrate 2 and an upper substrate 3 which constitute a pair of substrates. On the surfaces of the lower substrate 2 and the upper substrate 3, formed are a lower electrode 5 serving as a counter electrode, and an upper electrode 6 serving as a transparent electrode, respectively. This assembly constitutes a matrix structure as in a liquid-crystal display apparatus, and enables display control for every pixel of forming an image. Since the top of the display apparatus 1 is an image-displaying face, the upper substrate 3 is formed of a light transmitting material such as glass or an organic compound; and the upper electrode 6 is also a transparent electrode typically formed of ITO (indium tin oxide).

The two-layered porous film 4 has a large number of microholes 7 formed to run through between both surfaces thereof. The holes 7 are formed in such a density that the plurality of holes may exist within a region of each pixel of displaying an image in a matrix structure. A light transmitting liquid 8 and fine particles 9 are sealed up in each hole 7, and the two-layered porous film is sandwiched between the upper and lower substrates 2 and 3 so that the hole is closed.

The two-layered porous film b4 is composed of an upper transparent porous film 4a and a lower black porous film 4b, in which the plural holes 7 running through the thickness direction thereof are independent of each other. As the main material for the porous film used is an inorganic material such as glass or an organic material such as polycarbonate, polypropylene, polyamide or polyethylene.

In one example where the main material of the porous film is glass, porous glass that is referred to as silver-sand porous glass (SPG) may be used. Basic glass of SPG (calcium aluminoborosilicate glass) is synthesized and shaped at a temperature of about 1350° C. or thereabout with silver-sand lime or boric acid added thereto, and then heated to cause a phenomenon of phase separation in the microstructure of glass, and thereafter this glass is processed with hydrochloric acid or the like to dissolve $CaO.B_2O_3$, thereby forming a glass porous body having a skeleton of $Al_2O_3.SiO_2$-based glass. The mean pore size may be from 1 nm to 10 μm for easy production of the material.

As one example where the main material of the porous film is an organic material, there may be mentioned a polymer porous film formed according to an electron beam irradiation process. Electron beams (ionic beams, or charged particles) are applied to a polymer film to form loci of broken polymer chains, then the resulting film is chemically etched with a solvent to thereby broaden the loci to give micropores. The porous film produced according to the method is characterized in that cylindrical micro-through-holes having an extremely uniform diameter may be formed therein. For example, a polycarbonate porous film known as a trade name of Nuclepore has been popularized in application to precision filtration, and this is a general porous film produced in a known method, and those having a mean pore size of from 15 nm to 12 μm are commercially available.

The two-layered porous film 4 having a two-layered structure composed of the upper-layer transparent porous film 4a and the lower-layer black porous film 4b may be produced, for example, by bonding a transparent polycarbonate film and a black polycarbonate film colored with carbon black, and then forming cylindrical micro-through-holes uniformly in the resulting structure according to the method comprising ion beam irradiation and chemical etching such as that mentioned above. The lower-layer black porous film 4b may be colored with any other organic pigment or inorganic pigment than carbon black or with dye. The region including the plural holes 7 functions to display a pixel 10, and depending on the position of the fine particles 9, may function as a white display part 10a and a black display part 10b.

The electrophoretic phenomenon to be the driving principle of the fine particles 9 in the light transmitting liquid 8 is described herein. In the interface between solid and liquid, there occurs an electrochemical interaction, whereby the solid surface is charged and an electric double layer is formed in the liquid near the interface. A typical charging principle of solid is dissociation of a dissociable group existing in the solid surface. For example, in case where a carboxyl group (—COOH) that bonds to an alkyl group (R) exists in a solid surface, then the dissociable group dissociates as follows: R—COO⁻ remains in the solid surface, and therefore the solid charges negatively.

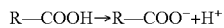

Apart from this, there may be a case where the solid is an oxide. This may be charged through adsorption of $H^+$ ion or $OH^-$ ion in water. When a solid surface is charged in the manner as above, then the oppositely-charged ions in liquid are electrostatically attracted, and an electric double layer is thereby formed. When an electric field is applied to such a site, then a slide face occurs inside the electric double layer and there occurs relative movement between the solid and the liquid. In electrophoresis, the liquid is stationary and the solid moves; and in electroosmosis, the solid is stationary and the liquid moves.

The thickness of the electric double layer is referred to as a length of Debye-Hueckel, and is computed as an approximate expression to be a function that is proportional to the square root of the ion concentration in the liquid. For example, in an electrolytic solution where a monovalent salt such as NaCl is dissolved in water at 25° C. to a concentration of 1 mol/m³, the thickness of the electric double layer may be about 10 nm.

For producing electrophoresis, an effective electric field must be applied to the system for acting thereon, for which a high-resistance liquid is used.

From the mechanism of electrophoresis mentioned above, the material of the light transmitting liquid 8 must have a characteristic capable of producing an electric double layer for the material of the porous film 4. In addition, since the material of the light transmitting liquid 8 is used in the display apparatus 1 for optical control, the material of the light transmitting liquid must be a highly light transmitting material. As the light transmitting liquid 8 that satisfies these requirements, known are aqueous liquids such as pure water and electrolytic water, and non-aqueous liquid materials such as benzene, xylene, cyclohexane, monosilane, siloxane or naphthalene-based liquids. For bettering the dispersibility of the fine particles 9, a surfactant may be added to the liquid, if desired.

In case where the fine particles 9 are white fine particles, then titanium oxide is a most typical material, but apart from it, also usable are any other organic pigments and inorganic pigments. For the purpose of improving the dispersibility, increasing the whiteness and controlling the specific gravity of the fine particles 9, the fine particles 9 may be subjected to surface treatment and/or surface coating, if desired. For example, in case where titanium oxide is used, then the fine particles 9 may move in the direction of gravity and sink since their specific gravity is higher than that of the light transmitting liquid 8 formed of the material mentioned above. For improving the image sustainability in field-off time, the specific gravity of the fine particles 9 shall be on the same level as that of the light transmitting liquid 8, for which the fine particles may be coated with a lightweight resin having a small specific gravity.

In case where the fine particles 9 are formed of a light transmitting material internally having at least one bubble therein, then the light transmitting material may be either an organic material or an inorganic material, and the fine particles may be formed according to a known micro-encapsulating technique. The specific gravity of the material internally having bubbles therein may be smaller than that of the liquid, and therefore in order to satisfy the object that the specific gravity of the fine particles can be on the same level as that of the liquid for the purpose of improving the image sustainability in field-off time as in the above-mentioned case, using a heavy light transmitting inorganic material having a large specific gravity such as glass may be relatively advantageous. As an example of such bubbles-containing glass, there may be mentioned a commercial product, Scotchlight by Sumitomo 3M. The mean particle size of Scotchlight is from 30 to 70 μm. When the volume ratio of the organic/inorganic light transmitting material for microcapsules to the bubbles is controlled, then the specific gravity may be controlled to be on the same level as the specific gravity of the light transmitting liquid 8. For the purpose of improving the dispersibility, increasing the whiteness and controlling the specific gravity of the fine particles 9, the fine particles 9 may be subjected to surface treatment and/or surface coating, if desired.

When a resin substrate of an organic compound is used for the upper substrate 3 and the lower substrate 2 between which the two-layered porous film 4 is sandwiched and when an electroconductive polymer is used for the transparent upper electrode 6 and the lower electrode 5, then the display apparatus 1 may be flexible as a whole. The upper substrate 3 must be transmissive of light, for which, therefore, usable is a resin material such as PMMA, polyolefin, polycarbonate, polyimide. The upper electrode 6 and the lower electrode 5 may be formed of a material containing an electroconductive polymer such as polyacetylene, polydiacetylene, polypyrrole, polyparaphenylene, pentacene, anthracene.

For filling the holes 7 of the two-layered porous film 4 with the light transmitting liquid 8 containing the fine particles 9, for example, the lower substrate 2 and the two-layered porous film 4 are bonded together so as to seal up one side of each hole 7, and then the light transmitting liquid 8 with the fine particles 8 dispersed therein is infiltrated into each hole 7 in vacuum, and thereafter the other side of each hole 7 is sealed up with the upper substrate 3. When the fine particles 9 are relatively large, near to the hole diameter in size, then they may be inserted into the holes 7 before the holes 7 are filled with the light transmitting liquid 8.

Figure 2:
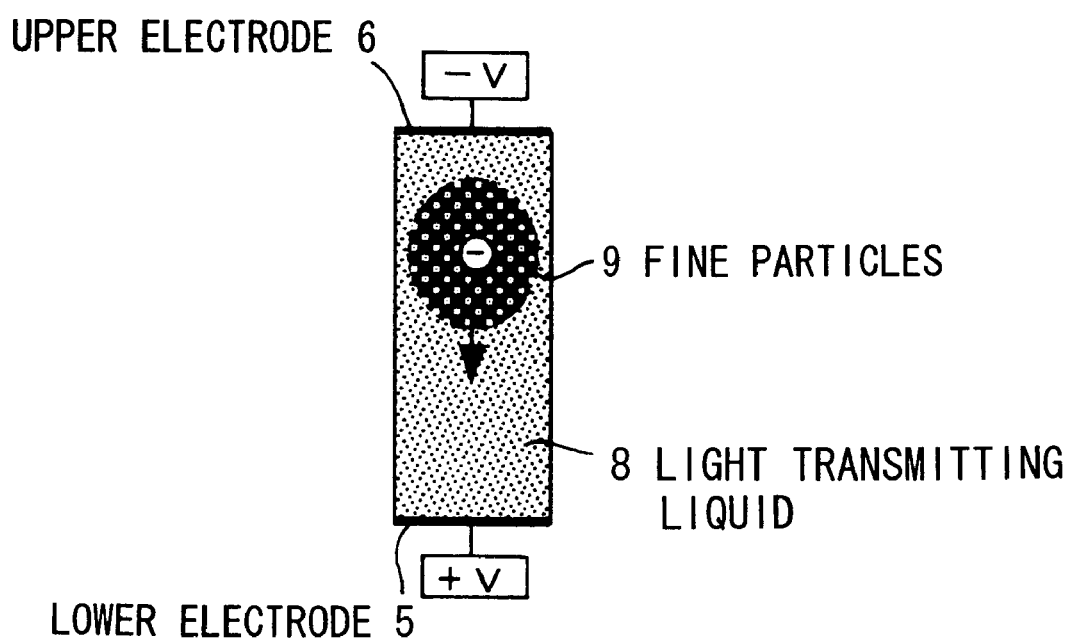
FIG. 2 is a view showing a driving principle of a light transmitting liquid 8 and fine particles 9 within one hole 7 formed in two-layered porous film 4 shown in FIG. 1.

FIG. 2 shows, in an enlarged manner, one hole 7 of the two-layered porous film 4 in the display apparatus 1 of this embodiment. The driving principle of the light transmitting liquid 8 and the fine particles 9 is described below with reference to FIG. 2. When the fine particles 9 are formed of glass and when the light transmitting liquid 8 is pure water, then the surfaces of the fine particles 9 of glass are kept charged minus. In this condition, when a minus voltage is applied to the upper electrode 6 and a plus voltage is to the lower electrode 5, then the minus ion-rich fine particles 9 move as having received downward thrust owing to the vertical-direction electric field generated in the light transmitting liquid 8. This is an electrophoretic phenomenon, by which the position of the fine particles 9 may be under field control. When an opposite voltage to that shown in FIG. 2 is applied to the apparatus, then the fine particles 9 may move upward according to the same phenomenon as above. After all, by controlling the polarity of the voltage to be applied between the upper electrode 6 and the lower electrode 5, the field direction may be thereby controlled and the electrophoretic direction may also be controlled whereby the fine particles 9 may be driven upward and downward.

FIG. 3 and FIG. 4 show a controlling method for image display in the display apparatus 1 of this embodiment. FIG. 3 is in the condition of displaying white; and FIG. 4 is in the condition of displaying black. In FIG. 3, the fine particles 9 are charged minus as in the case where the fine particles 9 are glass and the light transmitting liquid 8 is electrolytic water.

As in FIG. 3, when a plus voltage is applied to the side of the upper electrode 6, then the minus-charged fine particles 9 move upward. In this condition, the incident light to the transparent upper substrate 3 passes through the transparent upper electrode 6, then passes through the upper-layer transparent porous film 4a which is a transparent part of the two-layered porous film 4, and reaches the surfaces of the fine particles 9. The light having reached the surfaces of the fine particles 9 changes its running direction owing to the difference between the refractive index of the glass that constitutes the fine particles 9 and the refractive index of the electrolytic water of the light transmitting liquid 8 and owing to the curved surfaces of the fine particles 9. Then, the light having further reached the interface with the bubbles inside the fine particles 9 greatly changes its running direction owing to the significant difference in the refractive index between glass and air and owing to the curved surfaces of the fine particles 9. Specifically, the incident light is irregularly reflected on the surfaces of the fine particles 9 and inside them, and then again passes through the transparent part of the upper-layer transparent porous film 4a and passes through the transparent upper electrode 6 and upper substrate 3 to be a reflected light.

As a result of the irregular reflection passing through only the transparent part, a diffusive reflected light with no light loss may be obtained, and the apparatus therefore looks white.

As in FIG. 4, when a minus voltage is applied to the side of the upper electrode 6, then the minus-charged fine particles 9 move downward. In this condition, the incident light to the transparent upper substrate 3 passes through the transparent upper electrode 6, then passes through the transparent part of the upper-layer transparent porous film 4a or the transparent part of the light transmitting liquid 8 filled in the holes 7 of the two-layered porous film 4, further passes through the black part of the lower-layer black porous film 4b, and reaches the surfaces of the fine particles 9 whereupon the light intensity is attenuated. The light having reached the surfaces of the fine particles 9 greatly changes its running direction owing to the curved surfaces Of the fine particles 9 and owing to the significant change in the refractive index, as so mentioned hereinabove. Specifically, the incident light is irregularly reflected on the surfaces of the fine particles 9 and inside them, and then again passes through the black part of the lower-layer black porous film 4b whereupon the light intensity is attenuated. The incident light and the irregularly-reflected light are absorbed by the black part of the lower-layer black porous film 4b so that the light intensity is thereby fully attenuated, and therefore the intensity of the reflected light passing through the upper substrate 3 is nearly 0. As a result of the irregular reflection in the black part of the lower-layer black porous film 4b, the light is absorbed, not giving reflected light, and the apparatus therefore looks black.

Figure 5:
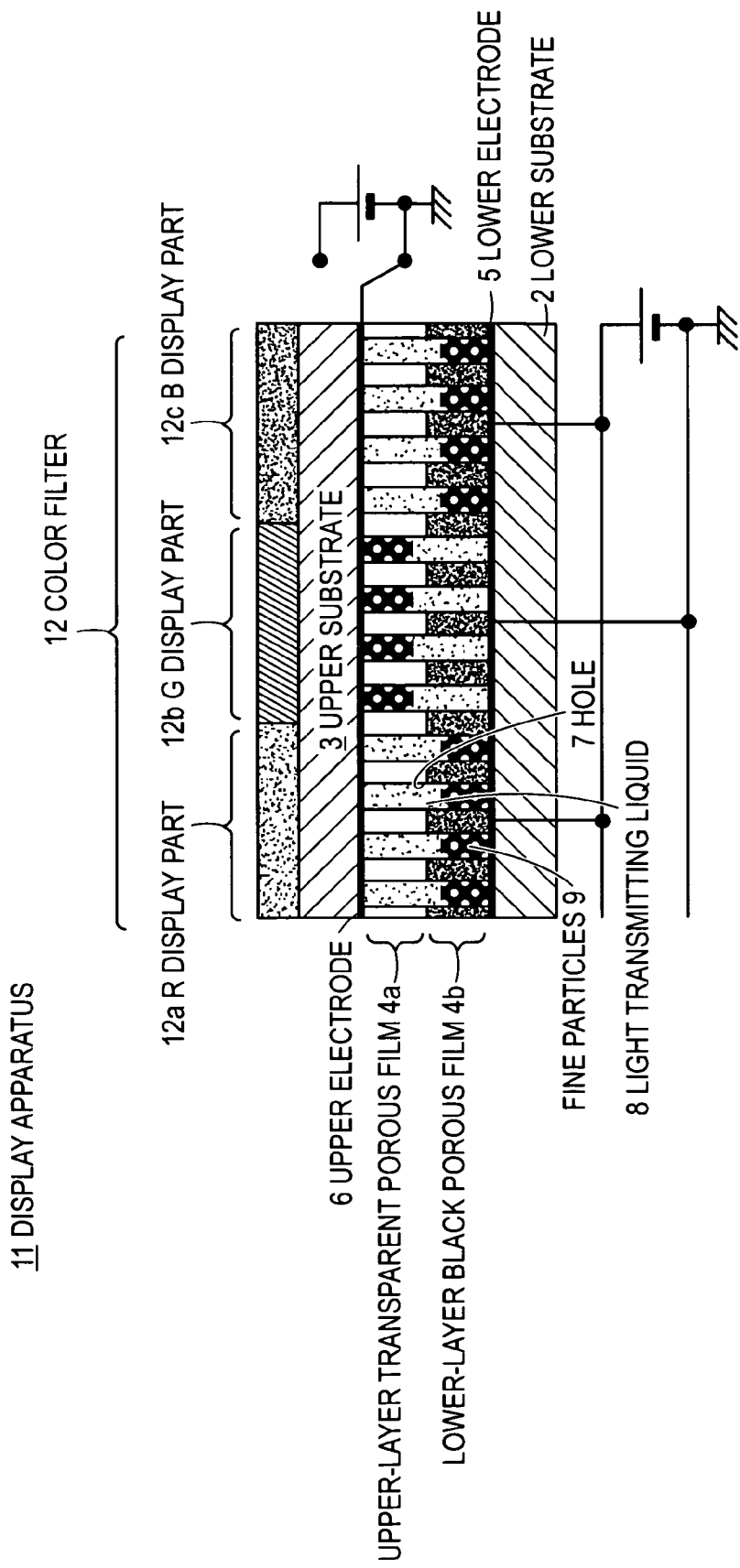
FIG. 5 is a view showing a structure in principle of a color display apparatus 11 according to a second embodiment of the invention.

FIG. 5 graphically shows a partly-cut cross-sectional structure of a color display apparatus 11 according to a second embodiment of the invention. The same reference numerals or signs are given to the same parts as those in the embodiment of FIG. 1, and repeated descriptions may be omitted herein. Also in this embodiment, the two-layered porous film 4 is sandwiched between the lower substrate 2 and the upper substrate 3, like in FIG. 1. On the surfaces of the lower substrate 2 and the upper substrate 3, formed are the lower electrode 5 and the upper electrode 6 tp, respectively. This assembly constitutes a matrix structure as in a liquid-crystal display apparatus, and enables pixel display control for image formation. Further on the upper substrate 3, formed is a color filter 12 for full color displaying. The color filter 12 includes at least an R display part 12a, a G display part 12b and a B display part 12c for displaying red (R), green (G) and blue (B), respectively.

In the condition of FIG. 5, a plus voltage is applied to the lower electrode 5 corresponding to the R display part 12a and the B display part 12c, and therefore the minus-charged fine particles 9 move downward. When the fine particles 9 move downward, light is scattered and absorbed by the lower-layer black porous film 4b, and therefore red by the R display part 12a and blue by the B display part 12c are absent and the two parts both look black. Contrary to these, in the G display part 12b where the fine particles 9 stay up, light is scattered on the surfaces of the fine particles 9 existing in the transparent part of the upper transparent porous film 4a, and therefore green coloration is attained.

Figure 6:
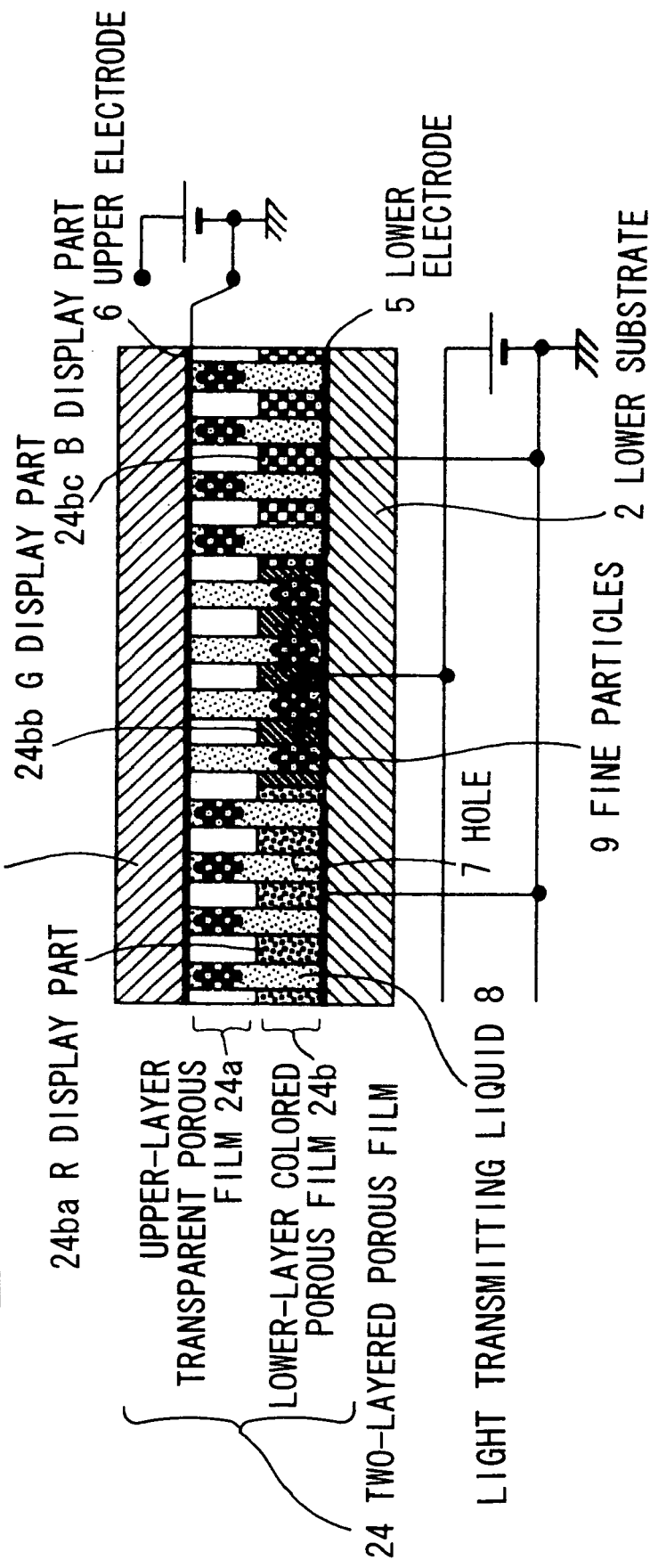
FIG. 6 is a view showing a structure in principle of a color display apparatus 21 according to a third embodiment of the invention.

FIG. 6 graphically shows a partly-cut cross-sectional structure of a color display apparatus 21 according to a third embodiment of the invention. The same reference numerals or signs are given to the same parts as those in the embodiment of FIG. 1, and repeated descriptions may be omitted herein. Also in this embodiment, the two-layered porous film 4 is sandwiched between the lower substrate 2 and the upper substrate 3, like in FIG. 1. On the surfaces of the lower substrate 2 and the upper substrate 3, formed are the lower electrode 5 and the upper electrode 6, respectively. This assembly constitutes a matrix structure as in a liquid-crystal display apparatus, and enables pixel control for image formation. Herein, the two-layered porous film 24 is composed of an upper-layer transparent porous film 24a and a lower-layer colored porous film 24b. The lower-layer colored porous film 24b comprises an R display part 24ba, a G display part 24bb and a B display part 24bc for the color parts of at least three primary colors of red (R), green (G) and blue (B) for full color displaying.

In the condition of FIG. 6, a plus voltage is applied to the lower electrode 5 corresponding to the G display part 24bb for green displaying, and therefore the minus-charged fine particles 9 move downward. When the fine particles 9 stay down, then light is scattered and absorbed by the G display part 24bb and therefore a green reflected light is given. As opposed to this, in the R display part 24ba and the B display part 24bc where the fine particles 9 are in the upper-layer transparent porous film 24a, light is scattered on the surfaces of the fine particles 9 and no light reaches the R display part 24ba and the B display part 24bc of the lower-layer colored porous film 24b, therefore giving a white reflected light. In this structure, the lower-layer colored porous film 24b serves as the color filter 12 in FIG. 5, and therefore this structure is simple, not requiring a color filter.

Figure 7:
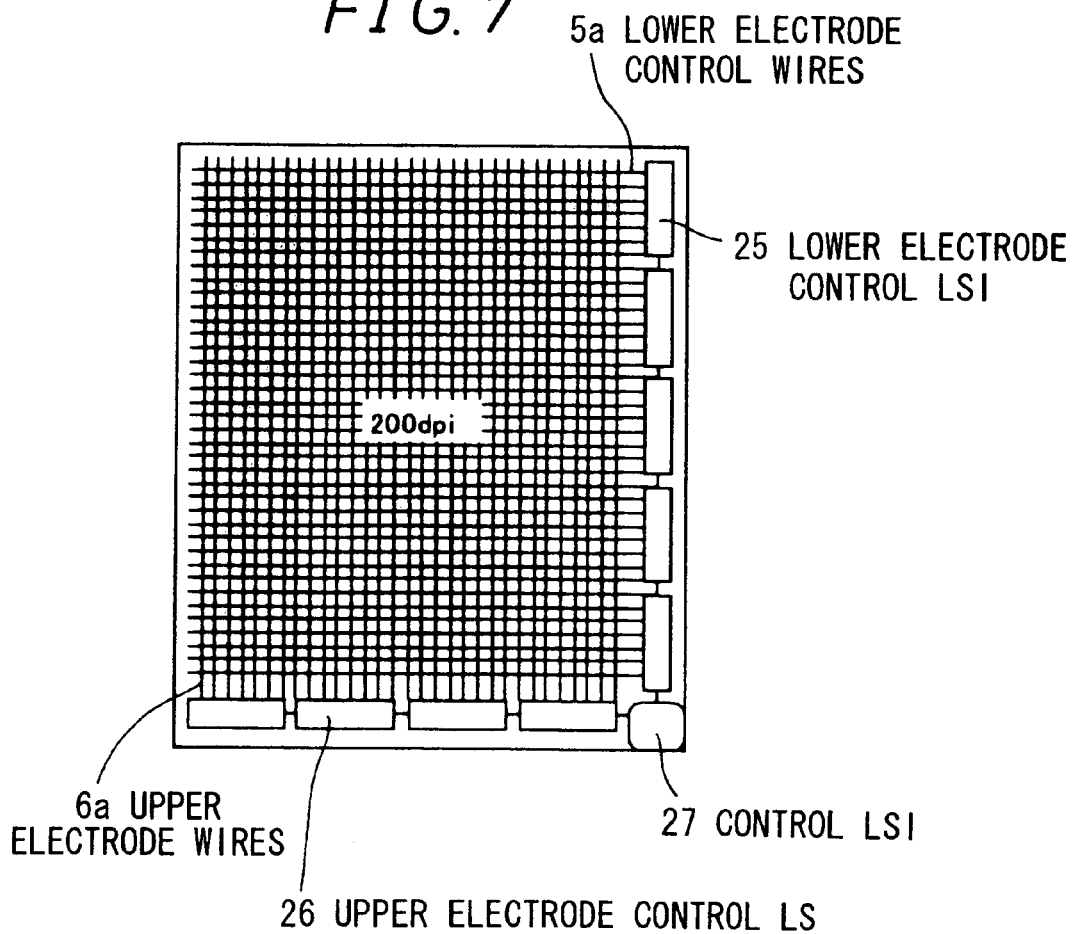
FIG. 7 is a view showing a matrix electrode structure for voltage application with each embodiment of the invention.

FIG. 7 graphically shows a matrix electrode structure with each embodiment of the invention. In the upper electrode 6 on the upper substrate 3, upper electrode control wires 6a are arranged at a regular pitch in the longitudinal direction, and in the lower electrode 5 on the lower substrate 2, lower electrode control wires 5a are arranged at a regular pitch in the lateral direction, thereby forming a matrix electrode structure. The lower electrode control wires 5a and the upper electrode control wires 6a are connected to a lower electrode control LSI25 and an upper electrode control LS26, respectively, for voltage control in accordance with the image information to be displayed. To the lower electrode control LSI25 and the lower electrode control LSI26, connected is a control LSI27 for controlling them. The method for image display control with the matrix electrode structure as above may be the same as that put into practical use for liquid-crystal display apparatuses.

In FIG. 7, when the image resolution is 200 dpi, then the arrangement pitch of the upper electrode control wires 6a and the lower electrode control wire 5a is 127 µm. When a standard silver-sand porous glass (SPG) or polycarbonate porous film as mentioned above is used, then plural holes having a mean hole diameter of at most about 10 µm can exist in one pixel, and good images may be formed.

Figure 8:
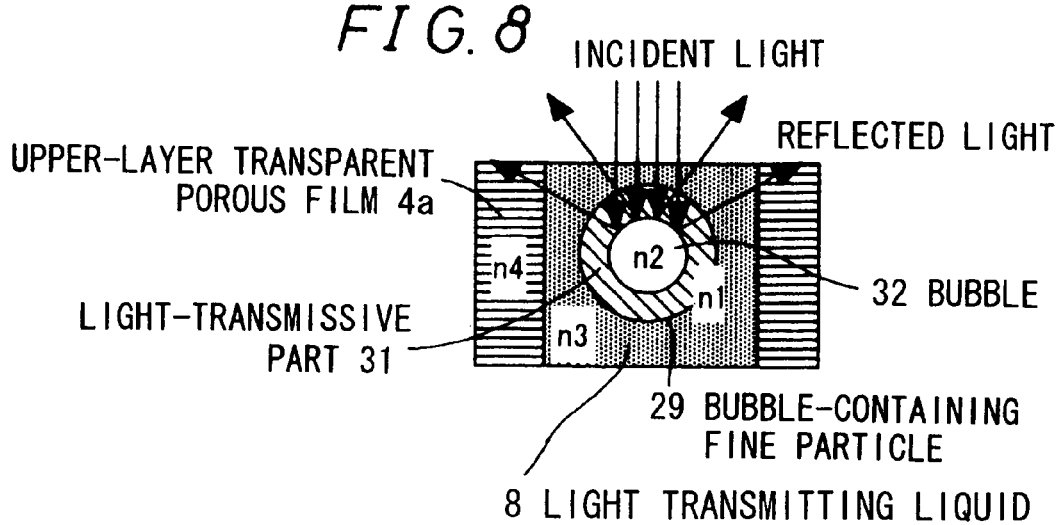
FIG. 8 is an enlarged view showing a reflection behavior of light on the surface of a bubble 32 in one bubble-containing fine particle 29 that may be used in the display apparatus 1, 11, 21 according to the first, second or third embodiment of the invention.

FIG. 8 shows an enlarged view of one bubble-containing fine particle 29 that may be used in the display apparatus 1; 11, 21 according to the first, second or third embodiment of the invention. With reference to FIG. 8, the reflection behavior of light on the surface of a bubble is described. Incident light is vertical to the substrate, the bubble-containing fine particle 29 is spherical, and the bubble 32 is encapsulated in the light transmitting part 31 of a light transmitting resin material. It is assumed that the following relationship is satisfied: Refractive index n2 of the bubble 32<refractive index n1 of the light transmitting part 31 of the bubble-containing fine particle 29=refractive index n3 of the light transmitting liquid 8. When the incident angle to the bubble interface is θ1 and the refractive angle is θ2, then the energy reflectance Rp and Rs and the energy transmittance Tp and Ts for polarization p and polarization are to be the following equations according to the Fresnel's reflection/refraction law.

$$Rp = \frac{\tan^2(\theta 1 - \theta 2)}{\tan^2(\theta 1 + \theta 2)}$$

$$Rs = \frac{\sin^2(\theta 1 - \theta 2)}{\sin^2(\theta 1 + \theta 2)}$$

$$Tp = \frac{\sin(2 \cdot \theta 1) \cdot \sin(2 \cdot \theta 2)}{\sin^2(\theta 1 + \theta 2) \cdot \cos^2(\theta 1 - \theta 2)}$$

$$Ts = \frac{\sin(2 \cdot \theta 1) \cdot \sin(2 \cdot \theta 2)}{\sin^2(\theta 1 + \theta 2)}$$

The refractive angle θ2 may be computed according to the Snell's law mentioned below. In case where light runs from a medium having a large refractive index n1 to another medium having a small refractive index n2, then the incident light at an angle larger than the incident angle θc computed according to the following equation is entirely reflected for total reflection. The equation corresponds to the Snell's low in which the refractive angle θ2=90°, and θc is generally referred to as a critical angle.

$$\frac{\sin\theta 1}{\sin\theta 2} = \frac{n2}{n1}$$

$$\sin\theta c = \frac{n2}{n1}$$

Figure 9:
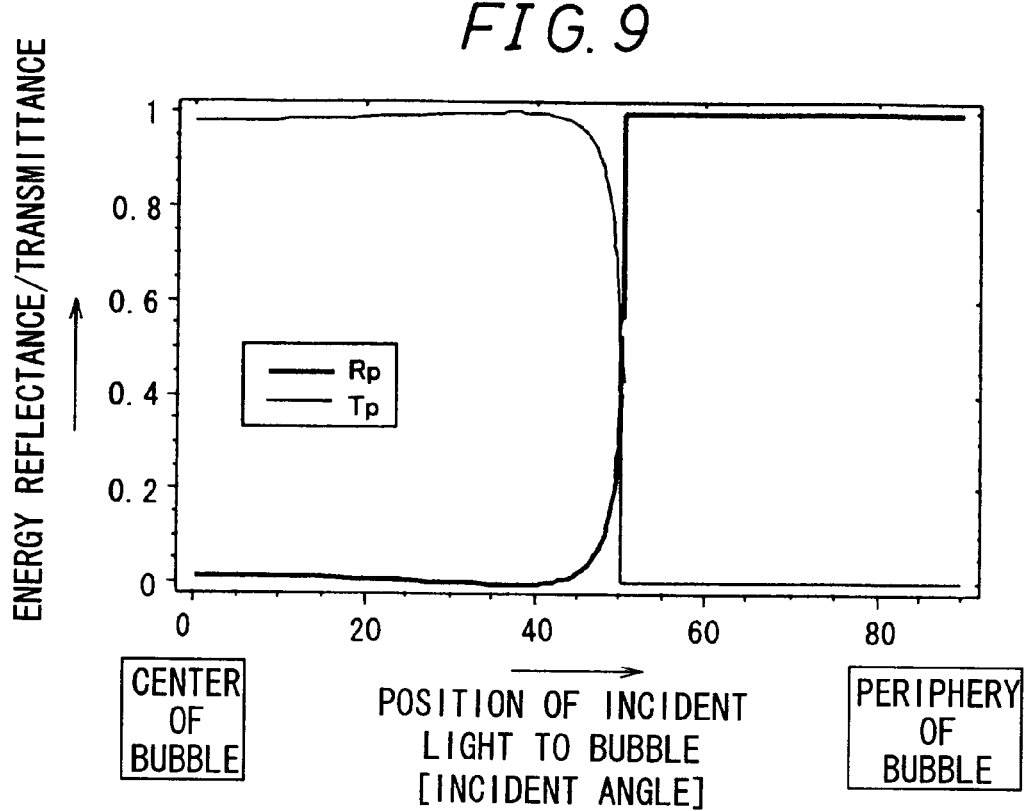
FIG. 9 is a view showing a relation of an incident angle of polarization p, energy reflectance Rp and energy transmittance Tp with regard to a bubble 32 shown in FIG. 8.
Figure 10:
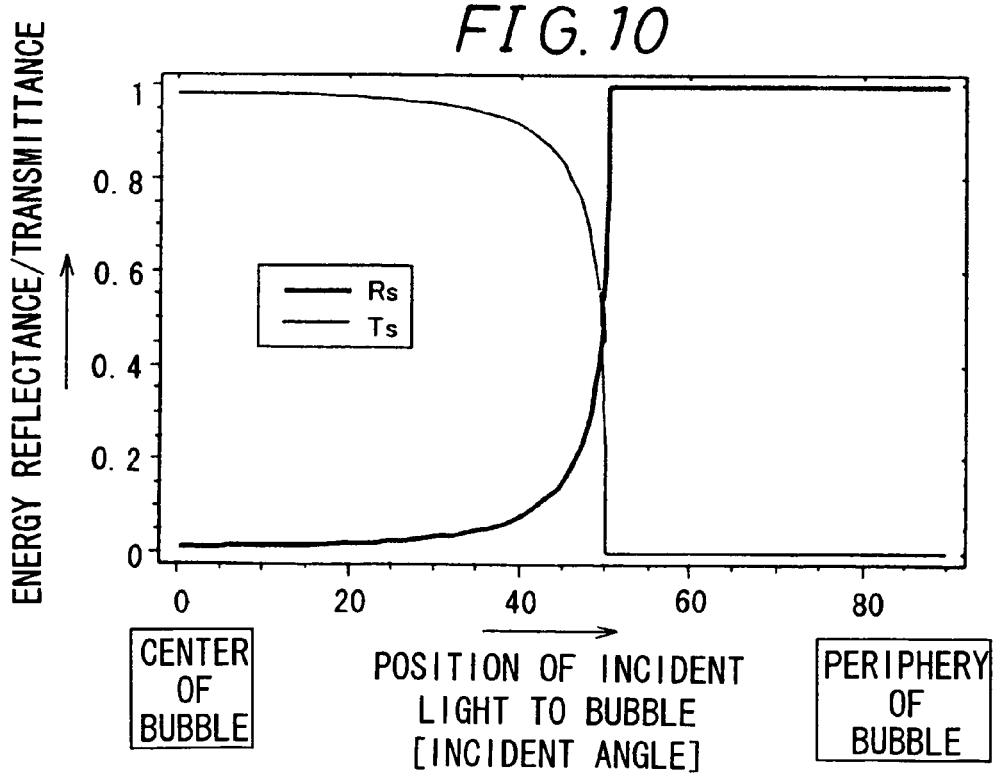
FIG. 10 is a view showing a relation of an incident angle of polarization s, energy reflectance Rs and energy transmittance Ts with regard to a bubble 32 shown in FIG. 8.

The incident light to the surface of the bubble 32 runs from the solid having a refractive index of n1 to the vapor having a refractive index of n2, and since n1>n2, the light undergoes total reflection as above and is scattered. Data of the energy transmittance and the energy reflectance computed for polarization p and polarization s on the basis of the formulae mentioned above are shown in FIG. 9 and FIG. 10, respectively. When the data are computed on the assumption that n1=1.3, then it may be considered that n2=1, and therefore the critical angle becomes about 50 degrees. As in FIG. 9 and FIG. 10, it is known that the energy reflectance for both the polarization p and the polarization is 100% at an incident angle of 50 degrees or more. The region of the large incident angle for total reflection corresponds to the periphery of the bubble 32. Specifically, the incident light toward the center part of the bubble 32 and therearound may almost be transmitted, but the incident light toward the periphery of the bubble 32 is almost reflected thereon.

When the refractive index n4 of the two-layered porous film 4 and the refractive index n3 of the light transmitting liquid 8 significantly differ from each other, then the light reflection or refraction as above occurs at the interface therebetween and therefore the optical properties of the apparatus are thereby worsened and the image contrast is lowered. Accordingly, it is necessary that the refractive index n4 of the two-layered porous film 4 and the refractive index n3 of the light transmitting liquid 8 are nearly equal to each other. Regarding the relationship between the refractive index of the light transmitting material that constitutes the fine particle 29, or that is, the refractive index n1 of the light transmitting part 31 and the refractive index n3 of the light transmissive liquid 8, the difference between the two shall be enlarged rather than the two are nearly equal to each other as in the above, whereby the effect of irregular reflection/irregular refraction owing to the refractivity difference is further larger when the incident light has reached the surface of the fine particle 29 and the interface to the light transmitting liquid 8, and as a result, sufficient light scattering may be attained and white may be displayed.

Next, the total of the energy reflectance at the upper surface of the bubble 32 is computed. On the assumption that the bubble 32 can be a circle having a radius r, then the equation of the circle based on the center of the circle as the origin of the coordinate axes and the incident angle θin at a coordinate x may be represented by the following formulae:

$$x^2 + y^2 = r^2$$

$$\theta \text{in} = \arccos\left(\frac{\sqrt{r^2 - x^2}}{r}\right)$$

From these formulae, the energy reflectance Rp and Rs may be represented with the refractive index n1, the refractive index n2, the bubble radius r, and the coordinate x; and the total of the energy reflectance $Rp_{All}$ and $Rs_{All}$ at the upper surface of the bubble 32 can be computed by the following integration:

$$Rp_{A11} = 2 \cdot \int_0^{\frac{\pi}{2}} Rp \cdot d\theta 1 = 2 \cdot \int_0^r Rp \cdot dx$$

$$Rs_{A11} = 2 \cdot \int_0^{\frac{\pi}{2}} Rs \cdot d\theta 1 = 2 \cdot \int_0^r Rs \cdot dx$$

When the data are computed on the assumption that n1=1.3, then $Rp_{All}$=0.254, and $Rs_{All}$=0.283. The actual incident light is free from polarization, and therefore the mean value of the polarization p and the polarization s, 0.268 is the total of the energy reflectance at the upper surface of the bubble 32.

The same computation applies to the lower surface of the bubble 32. The incident light to the surface of the bubble 32 runs from the vapor having a refractive index n2 to the solid having a refractive index n1, and since n1>n2, any total reflection as above does not occur. Accordingly, the total of the energy reflectance is an extremely small value. When the data are computed on the assumption that n1=1.3, then $Rp_{All}$=0.028, and $Rs_{All}$=0.066. The mean value of the polarization p and the polarization s is 0.047, and this becomes the total of the energy reflectance at the lower surface of the bubble 32.

After all, the total of the energy reflectance of one bubble 32 is, when computed on the assumption that n1=1.3, a value of the following equation:

0.268+(1−0.268)×0.047=0.302.

The computation is on the assumption that the incident light is light vertical to the substrate. The light source in practical use is a scattered light source, but since the bubble 32 is spherical, the total of the energy reflectance data can be the same as those computed herein. In the display apparatus 1, 11, 21, 30% of the incident light may be a scattered and reflected light, and this means that, when the bubble 32 is sufficiently small, then the apparatus can look white.

As in the display apparatus 1 in FIG. 1, when the lower layer of the two-layered porous film 4 is black for black displaying, then the measured reflectance value is 3%; and when the value is compared with the reflectance of the white part as above, 30%, then the contrast may be 1:10, and the image quality becomes good. When the refractive index of the solid is larger, then the critical angle is smaller, and therefore, the fact that the total of the energy reflectance at the surface of the bubble 32 may be large is obvious from the description as above. Accordingly, when the refractive index is 1.3 or more, then a good image having a contrast of 1:10 or more can be obtained.

The relationship between the size of the bubble-containing fine particle 29 and the visibility of the fine particle is organoleptically evaluated. When the size of the fine particle is 200 μm or more, then the periphery of the bubble-containing fine particle 29 looks white owing to scattering and reflection thereon, and the center part of the bubble-containing fine particle 29 may be transparent and the background black is seen; and, as a result, the fine particle is visible and a granular feeling is taken. As opposed to this, it has been found that, when the size of the fine particle is 100 μm or less, then the bubble-containing fine particle 29 is not almost visible and its granular feeling is almost lost. Accordingly, for obtaining good display images, the hole size of the two-layered porous film 4, 24 is at most 100 μm.

For displaying black, it is necessary that the light having been scattered and reflected at the upper part of the bubble 32 reaches the lower-layer black porous film 4b and is absorbed thereby. Accordingly, the bubble-containing fine particles 29 must be positioned as low as possible in the lower-layer black porous film 4b. When the mean hole diameter of the micro-holes to be formed in the porous body such as the two-layered porous film 4 is made smaller than the thickness of the porous body and when the mean size of the fine particles is made smaller than the thickness of the porous body, then the position of the fine particles may be in the lower part of the holes 7 in the black part of the lower-layer black porous film 4b, and, as a result, the black part of the lower-layer black porous film 4b may enjoy a sufficient light-absorption effect to increase the degree of blackness thereof, therefore providing a sufficient image contrast.

In case where plural bubbles 32 are in the fine particle 29 or in case where plural fine particles 9 are sealed up in one cylindrical micro-pore 7 of the two-layered porous film 4, 24, then, from the understanding of reflection and refraction as above, the light having passed through one bubble 32 or fine particle 9 can be irregularly reflected by another bubble 32 or fine particle 9, and therefore the total of the energy reflectance can be increased. Specifically, by sealing up fine particles with plural bubbles internally contained therein in the holes of the porous film, or by sealing up plural fine particles themselves therein, the scattered and reflected light intensity is increased, and the total of the energy reflectance may be near to 1, and therefore the image contrast may be further bettered.

As described hereinabove, the display apparatus 1, 11, 21 of the first, second and third embodiments have an extremely simple structure in which the light transmitting liquid 8 and the fine particles 9, 29 are sealed up in the two-layered porous film 4, 24, and therefore, the fine particles 9, 29 and the light transmitting liquid 8 can be sealed up in such small spaces. Accordingly, the apparatuses can evade the problem of aggregation of the electrophoretic fine particles 9, 29, their life may be prolonged.

Utilizing the scattering and reflection phenomena at the surfaces of the fine particles 9 as combined with the two-layered porous film 4 having a light transmitting part and a black part, black and white can be expressed according to the position of the fine particles 9 and therefore images of good contrast can be displayed.

When the mean hole diameter of the micro-holes 7 formed in the two-layered porous film 4, 24 is at most 100 μm, then the granular feeling of the image to be caused by the porous form of the film can be prevented even when the displayed image is seen near the apparatus.

When the mean hole diameter of the micro-holes 7 formed in the two-layered porous film 4 is smaller than the thickness of the two-layered porous film 4 and the mean particle size of the fine particles 9, 29 is smaller than the thickness of the two-layered porous film 4, and when the position of the fine particles 9, 29 is in the black part of the lower-layer black porous film 4b, then the apparatus may enjoy a sufficient light-absorption effect, therefore providing a sufficient image contrast with an increased degree of blackness.

When plural fine particles are sealed up in one cylindrical micro-hole 7 formed in the two-layered porous film 4, 24 or when the fine particles 29 with plural bubbles 32 internally contained therein are used, then the degree of whiteness may further increase and a sufficient image contrast may be thereby obtained.

When the material of constituting the two-layered porous film 4, 24, and the upper substrate 3 and the lower substrate 2 contains an organic compound, when the upper electrode 6 and the lower electrode 5 disposed adjacent to the upper substrate 3 and the lower substrate 2 contain an electroconductive polymer and when the display apparatus 1, 11, 21 is constructed to be flexible as a whole, then flexible, paper-like display apparatuses can be realized.

When a color filter 12 of R, G and B is disposed on the substrate adjacent to the light transmitting side of the two-layered porous film 4 so as to control the light scattering on the two-layered porous film 4, then the brightness of R, G and B can be controlled and the display apparatus 11 enables color displaying.

When the colored part side of the lower-layer colored porous film 24b of the two-layered porous film 24 is so designed as to have a micro-periodic color region structure of at least three colors and when the light scattering at the two-layered porous film 24 is controlled, then the display apparatus 21 enables color displaying.

Figure 11:
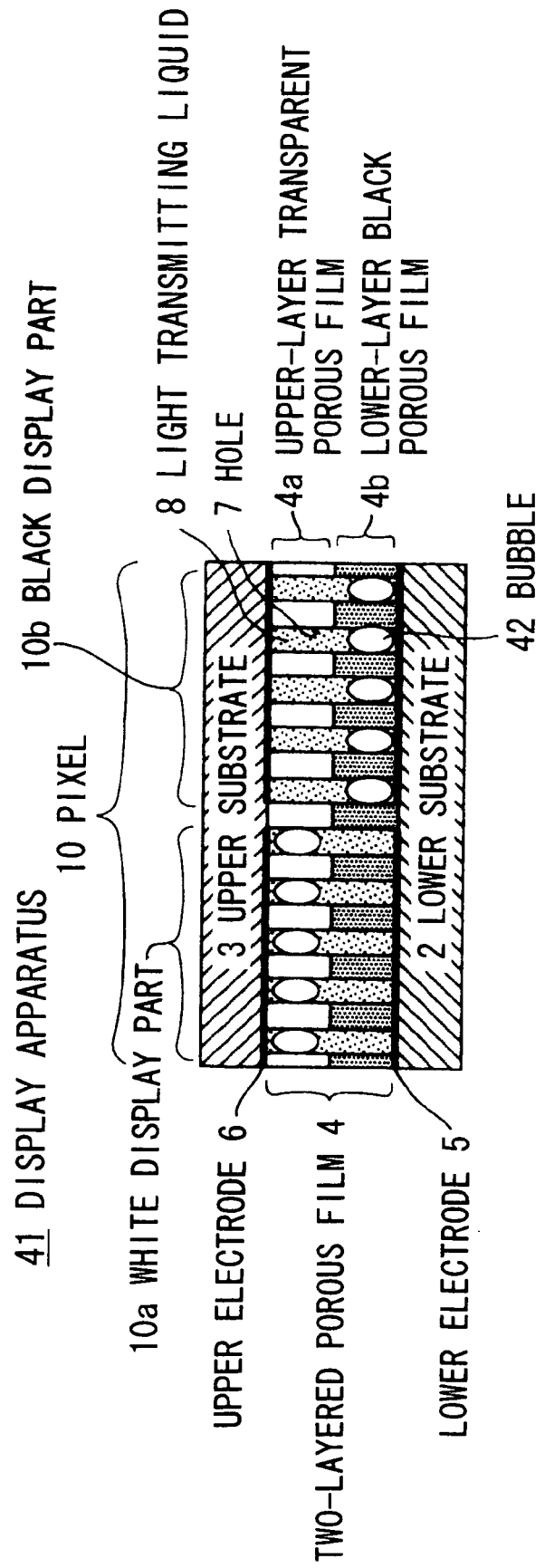
FIG. 11 a view graphically showing a cross-sectional structure in a thickness direction of a part of a display apparatus 41 according to a fourth embodiment of the invention.

FIG. 11 graphically shows a cross-sectional structure in the thickness direction of a part of a display apparatus 41 according to a fourth embodiment of the invention. In this embodiment, the same reference numerals or signs are given to the same parts as those in the embodiment shown in FIG. 1, FIG. 5 or FIG. 6, and repeated descriptions may be omitted herein. Also in the display apparatus 41 of this embodiment, the two-layered porous film 4 is sandwiched between the lower substrate 2 and the upper substrate 3. On the surfaces of the lower substrate 2 and the upper substrate 3, formed are the lower electrode 5 and the upper electrode 6, respectively. This assembly constitutes a matrix structure for pixel control for image displaying. Of the display apparatus 41, the upper part is an image-displaying face, and therefore, the upper substrate 3 is formed of a light transmitting material such as glass or organic compound; and the upper electrode 6 is also a transparent electrode typically formed of ITO.

In the holes 7 of the two-layered porous film 4, sealed up are a light transmitting liquid 8 for generating electroosmotic flows, and bubbles 42 for controlling the optical properties of the apparatus; and the two-layered porous film is sandwiched between the upper and lower substrates 3 and 2 so that the hole is closed. The constitution and the material of the two-layered porous film 4 may be the same as those in the first embodiment.

For generating electroosmosis, an effective electric field must be applied to the apparatus, for which a high-resistance liquid may be used. The thickness of the electric double layer as described in the first embodiment is generally from a few nm to tens nm, and therefore the liquid in the micro-holes 7 of around 1 μm in size may be easy to move.

From the electroosmotic mechanism of that type, the characteristic of the material of the light transmitting liquid 8 must have a characteristic to generate electroosmotic flows for the material of the two-layered porous film 4. Since the light transmitting liquid 8 is used in the display apparatus 41 for optical control, its material must be highly transmissive of light. As the light transmitting liquid 8 satisfying these conditions, known are aqueous liquids such as pure water and electrolytic water, and non-aqueous liquid materials such as benzene, xylene, cyclohexane, monosilane, siloxane or naphthalene-based liquids, as mentioned hereinabove. Of such non-aqueous liquid materials, those having a halogen or an alkyl group as the functional group are especially effective for expressing electroosmosis.

When a resin substrate comprising an organic compound is used for the upper substrate 3 and the lower substrate 2 between which the two-layered porous film 4 is sandwiched and when an electroconductive polymer is used for the transparent upper electrode 6 and the lower electrode 5, then the display apparatus 41 may be flexible as a whole. Since the upper substrate 3 must transmit light, a resin material such as PMMA (methacrylic resin), polyolefin, polycarbonate or polyimide may be used therefor. The upper electrode 6 and the lower electrode 5 may be formed of a material containing an electroconductive polymer such as polyacetylene, polydiacetylene, polypyrrole, polyparaphenylene, pentacene, anthracene.

Figure 12:
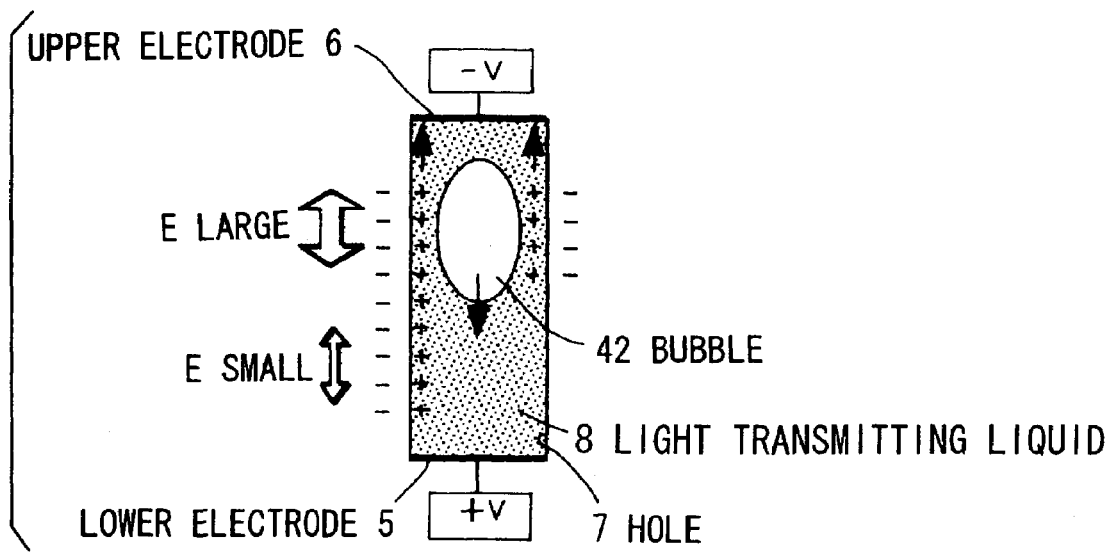
FIG. 12 is a view showing a driving principle of a light transmitting liquid 8 and a bubble 42 within one hole 7 formed in two-layered porous film 4 shown in FIG. 11.

FIG. 12 shows, in an enlarged manner, one hole 7 formed in the two-layered porous film 4 in the display apparatus 41 of FIG. 11. The driving principle of the light transmitting liquid 8 and the bubble 42 in this embodiment is described with reference to FIG. 12. When the two-layered porous film 4 is formed of a glass material and when the light transmitting liquid 8 is electrolytic water, then the glass surface of the inner periphery of the hole 7 is charged minus, as in FIG. 12, and the light transmitting liquid 8 in the interface is rich in plus ions. Such an electric double layer is formed uniformly in the entire region of the interface between glass and water irrespective of the presence or absence of the bubble 42. In this condition, when a minus voltage is applied to the upper electrode 6 and a plus voltage is to the lower electrode 5, then the plus ion-rich liquid in the interface moves as having received upward thrust owing to the vertical-direction electric field generated in the entire liquid. In this case, the liquid existing in the interface receives the thrust directly from the electric field, but owing to the influence of viscosity thereof, even the liquid in the center part of the hole 7, which is remote from the interface, may also receive upward thrust. In case where both ends of the hole 7 are not closed, then an upward flow with no velocity distribution may be generated from the interface to the center part of the hole 7.

A resistor is taken into consideration. When the volume resistivity ρ of the resistor is constant, then the resistance R of a cylindrical form thereof having a cross section S and a length l may be represented by the following equation:

$$R = \rho \times l \div S.$$

Since the part of the light transmitting liquid 8 in FIG. 12 may be considered as a resistor having a constant volume resistivity, the basic characteristic is applicable thereto. Accordingly, the periphery of the bubble 42 has a small cross section and its resistance is therefore high; while the part not having the bubble 42 has a large cross section and its resistance is therefore low. Since the liquid part may be considered as an equivalent circuit of series resistance, the resistance of the periphery of the bubble 42 is high, and therefore the partial voltage thereof is high; while the resistance of the part not having the bubble 42 is low, and therefore the partial voltage thereof is small. After all, the periphery of the bubble 42 has a high electric field E, and the part not having the bubble 42 has a low electric field E. Accordingly, the thrust generated in the liquid around the bubble 42 is relatively large. Since the thrust generated in the liquid around the bubble 42 is large and since the hole 7 is closed, the light transmitting liquid 8 runs upward above the bubble 42, and therefore the bubble 42 moves relatively downward.

When a voltage is applied to the apparatus oppositely to the direction shown in FIG. 12, then the light transmitting liquid 8 moves downward and the bubble 42 moves upward according to the same principle as above. After all, by controlling the voltage to be applied between the transparent upper electrode 6 and the lower electrode 5, the direction of the electric field may be controlled and the direction of the electroosmotic flows may also be controlled, and the bubble 42 may be thereby moved in the vertical direction.

Figure 13:
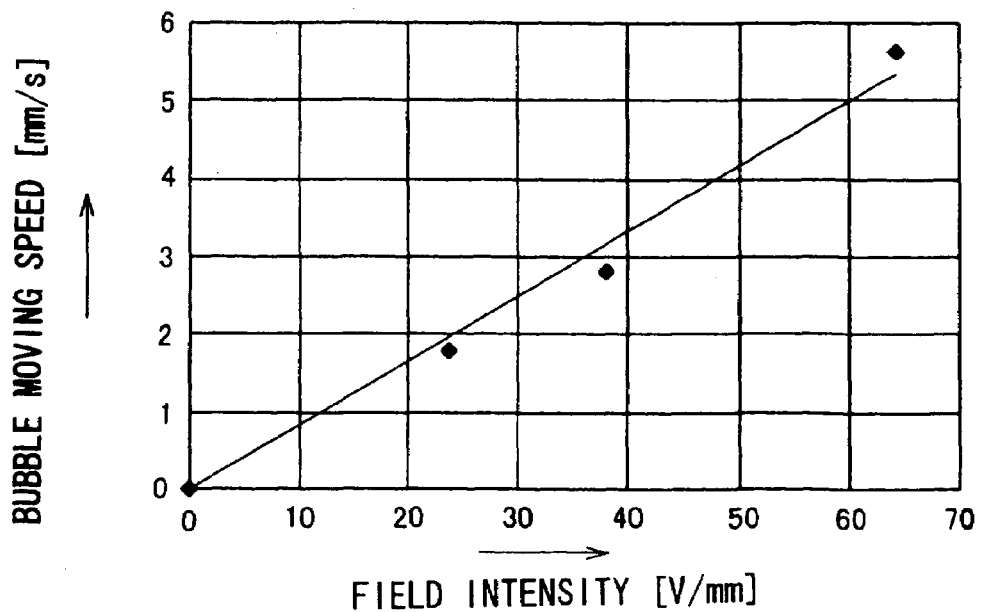
FIG. 13 is a view showing a relation between field intensity and moving speed of a bubble shown in FIG. 12.

FIG. 13 is a result of an experiment with the apparatus where the two-layered porous film 4 is formed of glass and the light transmitting liquid 8 is pure water, showing the relationship between the field intensity in the axial direction of the hole 7 and the moving speed of the bubble 42. The characteristic obtained shows that, in proportion to the increase in the field intensity in the axial direction of the hole 7, or that is, in the thickness direction of the two-layered porous film 4, the moving speed of the bubble 42 increases. For example, when a voltage of 5 V is applied to the two-layered porous film 4 having a thickness of 100 μm, then it is understood that the field intensity is 50 [V/mm] and the speed characteristic of the bubble 42 is 4.1 [mm/s]. Accordingly, the time to be taken for moving through the film thickness of 100 μm is 0.1/4.1=0.024 [sec]. The response time, 24 msec is equivalent to the response speed of a liquid-crystal display apparatus, and it is a sufficient characteristic value for display apparatuses.

Figure 14:
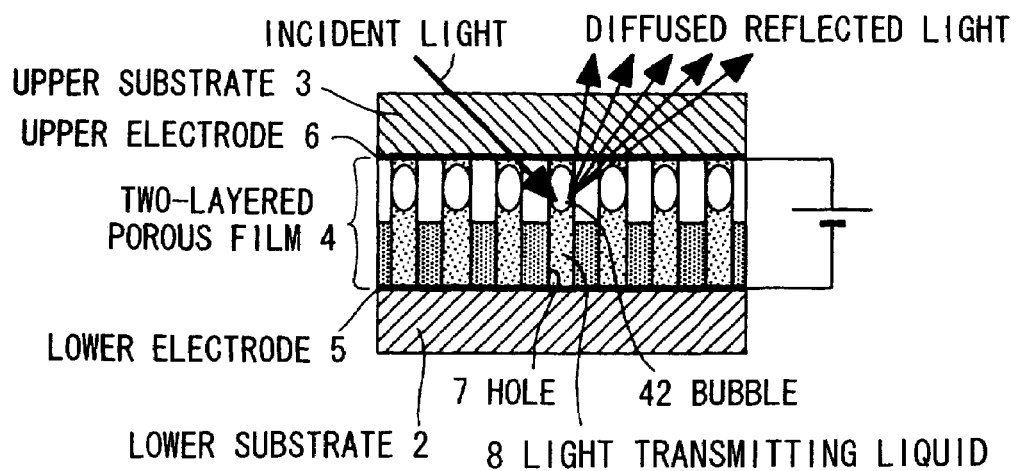
FIG. 14 is a view showing a method for voltage application to display a white image in a display apparatus 41 shown in FIG. 11.
Figure 15:
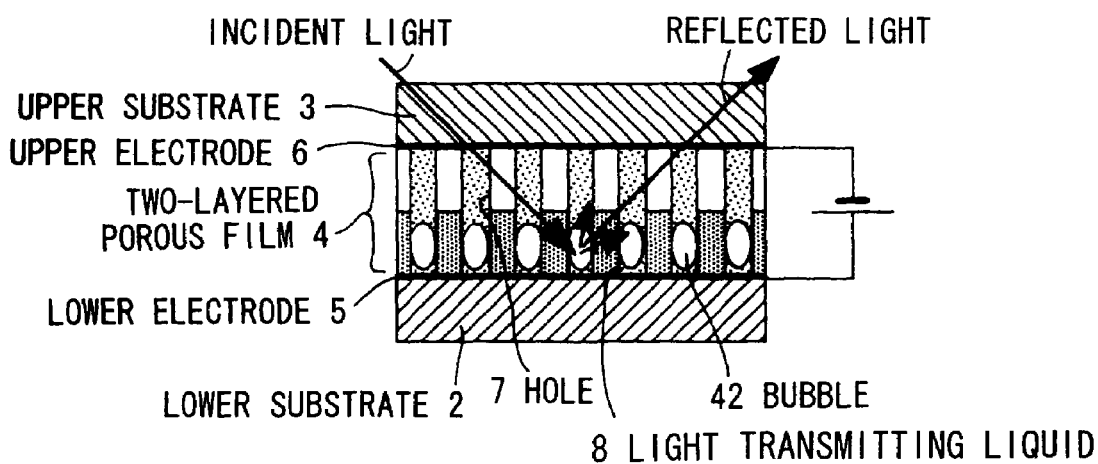
FIG. 15 is a view showing a method for voltage application to display a black image in a display apparatus 41 shown in FIG. 11.

FIG. 14 and FIG. 15 show an image-controlling method with the display apparatus 41 of this embodiment. FIG. 14 shows a white-displaying condition; and FIG. 15 shows a black-displaying condition. A combination of constitutive materials is taken into consideration where the two-layered porous film 4 is charged minus and the light transmitting liquid 8 at the interface is charged plus, for example, like a case where the two-layered porous film 4 is glass and the light transmitting liquid 8 is electrolytic water.

As in FIG. 14, when a plus voltage is applied to the side of the transparent upper electrode 6, then an electroosmotic phenomenon of such that the plus-charged light transmitting liquid 8 moves downward occurs, and, as a result, the bubble 42 moves upward thereby relatively. In this condition, the incident light to the transparent upper substrate 3 passes through the transparent upper electrode 6, then through the transparent part of the upper-layer transparent porous film 4a, and reaches the surface of the bubble 42. The light thus having reached the surface of the bubble 42 greatly changes its running direction owing to the curved surface of the bubble 42 and to the significant refractivity change. Specifically, the incident light is irregularly reflected on the surface of the bubble 42, and then again passes through the transparent part of the upper-layer transparent porous film 4a and passes through the transparent upper electrode 6 and upper substrate 3 to be a reflected light. As a result of the irregular reflection passing through only the transparent part, a diffusive reflected light with no light loss may be obtained, and the apparatus therefore looks white.

As in FIG. 15, when a minus voltage is applied to the side of the transparent upper electrode 6, then an electroosmotic phenomenon of such that the plus-charged light transmitting liquid 8 moves upward occurs, and, as a result, the bubble 42 moves downward thereby relatively. In this condition, the incident light to the transparent upper substrate 3 passes through the transparent upper electrode 6, then through the transparent part of the upper-layer transparent porous film 4a or the transparent part of the light transmitting liquid 8 filled in the hole 7 of the two-layered porous film 4, further passes through the black part of the lower-layer black porous film 4b, and reaches the surface of the bubble 42 whereupon the light intensity is attenuated. The light having reached the surface of the bubble 9 greatly changes its running direction owing to the curved surface of the bubble 42 and owing to the significant refractivity change. Specifically, the incident light is irregularly reflected on the surface of the bubble 42, and then again passes through the black part of the lower-layer black porous film 4b whereupon the light intensity is attenuated. The incident light and the irregularly-reflected light are absorbed by the black part of the lower-layer black porous film 4b so that the light intensity is thereby fully attenuated, and therefore the intensity of the reflected light passing through the upper substrate 3 is nearly 0. As a result of the irregular reflection in the black part of the lower-layer black porous film 4b, the light is absorbed, not giving reflected light, and the apparatus therefore looks black.

Figure 16:
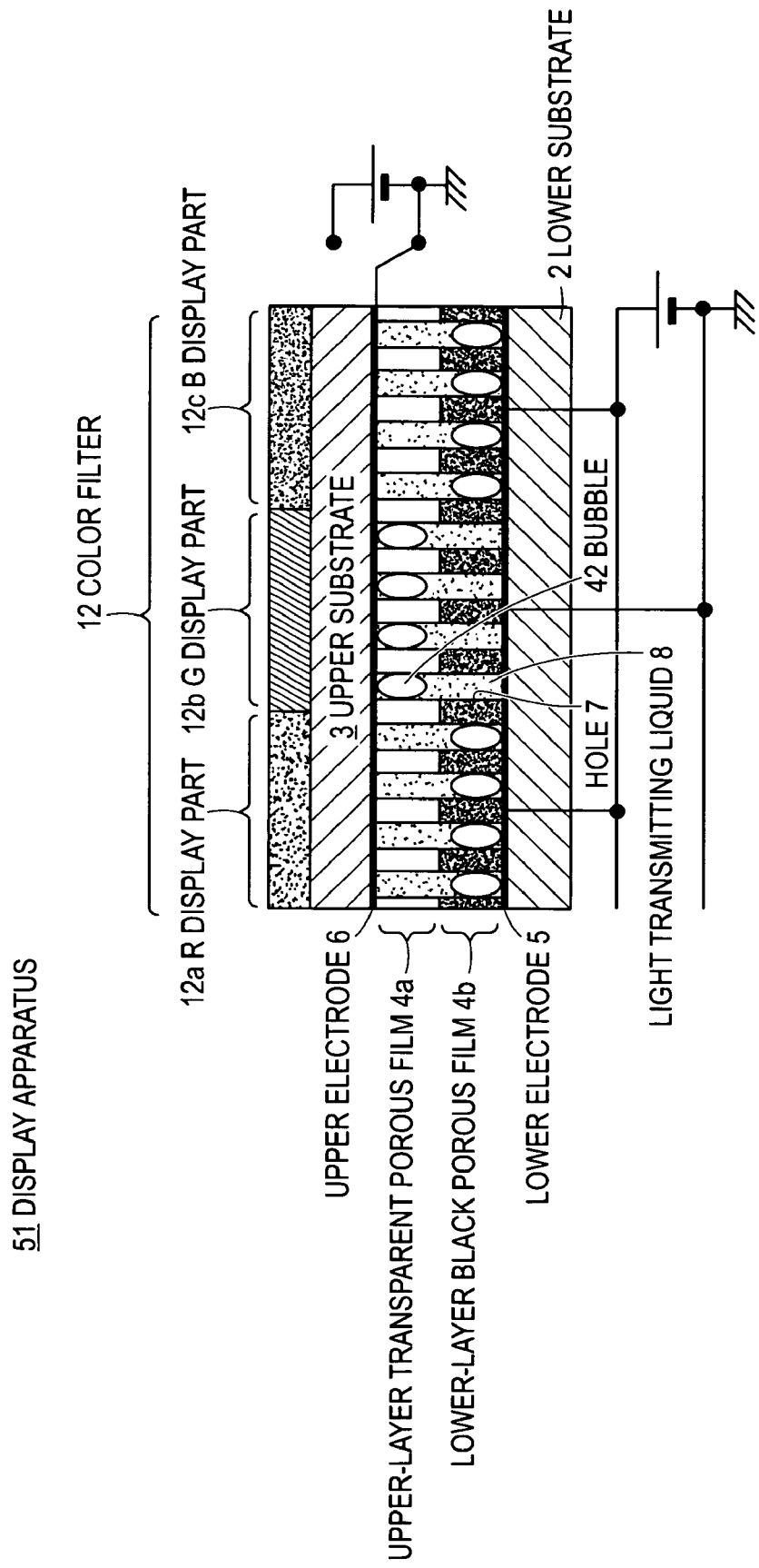
FIG. 16 is a view showing a structure in principle of a color display apparatus 51 according to a fifth embodiment of the invention.

FIG. 16 graphically shows a partly-cut cross-sectional structure of a color display apparatus 51 according to a fifth embodiment of the invention. This embodiment is similar to the second embodiment shown in FIG. 5, and the same reference numerals or signs are given to the corresponding parts in these, and repeated descriptions may be omitted herein. In this embodiment, the position of the bubbles 42 is changed by voltage control, in place of the fine particles 9 in FIG. 5, for color displaying.

Figure 17:
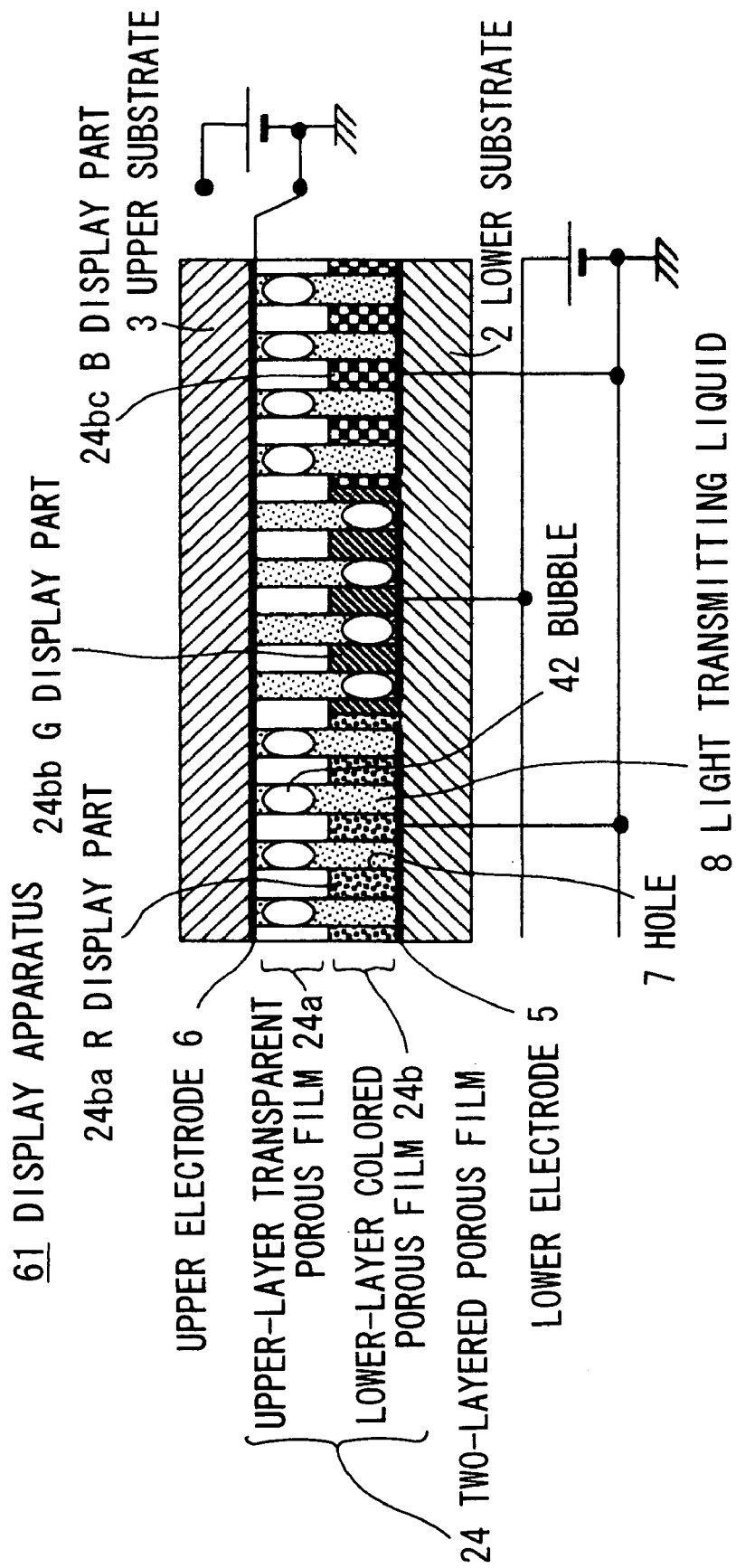
FIG. 17 is a view showing a structure in principle of a color display apparatus 61 according to a sixth embodiment of the invention.

FIG. 17 graphically shows a partly-cut cross-sectional structure of a color display apparatus 61 according to a sixth embodiment of the invention. This embodiment is similar to the third embodiment shown in FIG. 6, and the same reference numerals or signs are given to the corresponding parts in these, and repeated descriptions may be omitted herein. Also in this embodiment, the position of the bubbles 42 is changed by voltage control, in place of the fine particles 9 in FIG. 6, for color displaying.

Also in the display apparatuses 41, 51, 61 of the fourth, fifth and sixth embodiments of the invention, the matrix electrode structure as in FIG. 7 is used for the lower electrode 5 and the upper electrode 6. For the method for putting the light transmitting liquid 8 and the bubble 42 into each hole 7, the hole 7 is not completely filled with light transmitting liquid 8 in the manner of vacuum filling as described, but a vapor such as air is introduced into the empty space in the hole 7 and then the hole 7 may be completely sealed up.

Figure 18:
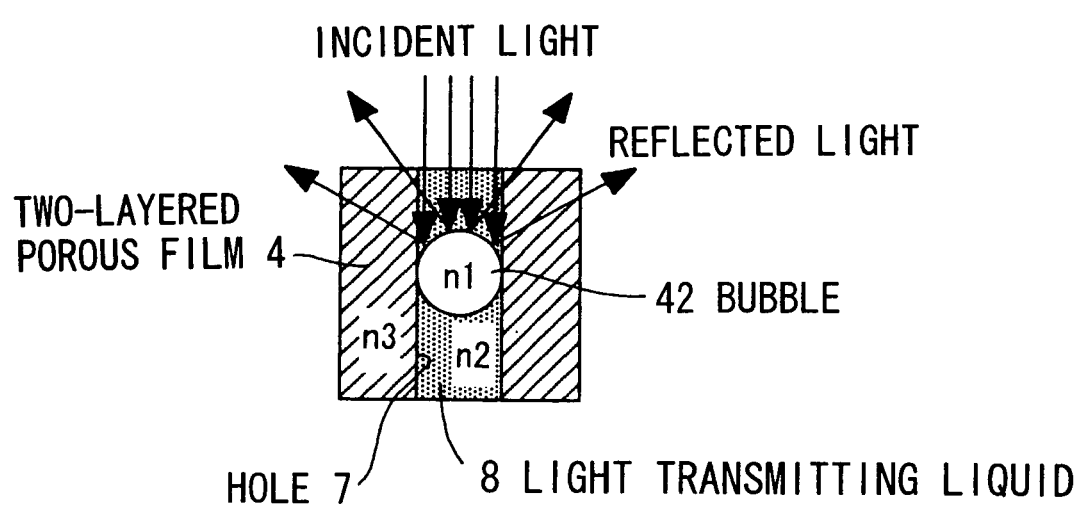
FIG. 18 is an enlarged view showing a reflection behavior of light on a surface of one bubble 42 that may be used in the display apparatus 41, 51, 61 according to the fourth, fifth or sixth embodiment of the invention.

FIG. 18 shows, in an enlarged manner, one hole 7 in the display apparatus 41, 51, 61 according to the fourth, fifth and sixth embodiments of the invention. Regarding the reflection behavior of the light on the surface of the bubble 42, when refractive index n2 of bubble 42<refractive index n1 of light transmitting liquid 8=refractive index n3 of porous material, then the relationship described between the refractive index n2 of the bubble 32 and the refractive index n1 of the light transmitting part 31 of the fine particle 29 in FIG. 8 may apply similarly to the relationship between the refractive index n2 of the bubble 42 and the refractive index n1 of the light transmitting liquid 8. In FIG. 8, it is desirable that the refractive index n3 of the two-layered porous film 4, 24 is nearly equal to the refractive index n1 of the light transmitting liquid 8, like the description of the situation that the refractive index n4 of the two-layered porous film 4, 24 should be nearly equal to the refractive index n3 of the light transmitting liquid 8.

The reflectance measured when the lower layer of the two-layered porous film 4 is black for black displaying is 3% and the reflectance of the white part obtained in the manner as above is 30%; and therefore the contrast is 1:10 and the image quality becomes good. Since the critical angle is smaller when the refractive index of the light transmitting liquid 8 is larger, it is obvious that the total of the energy reflectance on the surface of the bubble 42 is larger from the description as above. Accordingly, in case where the refractive index of the two-layered porous film 4 and the light transmitting liquid 8 is at least 1.3, then a good image having a contrast of at least 1:10 can be obtained.

The relationship between the size of the bubble 42 and the visibility of the bubble 42 is organoleptically evaluated. When the size of the bubble 42 is 200 m or more, then the periphery of the bubble 42 looks white owing to scattering and reflection thereon, and the center part of the bubble 42 may be transparent and the background black is seen; and, as a result, bubble 42 is visible and a granular feeling is taken. As opposed to this, it has been found that, when the size of the bubble 42 is 100 μm or less, then the bubble 42 is not almost visible and its granular feeling is almost lost. Accordingly, for obtaining good display images, the hole size of the two-layered porous film 4, 24 is at most 100 μm.

For displaying black, it is necessary that the light having been scattered and reflected at the upper part of the bubble 42 reaches the lower-layer black porous film 4b and is absorbed thereby. Accordingly, the bubble 42 must be positioned as low as possible in the lower-layer black porous film 4b. In case where the mean hole diameter of the micro-holes 7 to be formed in the two-layered porous film 4 is made smaller than the thickness of the two-layered porous film 4, then the apparatus may enjoy a sufficient light absorption effect when the position of the bubble 42 is in the black part of the lower-layer black porous film 4b, thereby increasing the degree of blackness thereof and providing a sufficient image contrast.

In case where plural bubbles 42 are in the hole 7 of the two-layered porous film 4 and especially when two bubbles 42 are therein as aligned vertically, the optical properties of the apparatus are described. When the refractive index of the light transmitting liquid 8 is 1.3, then the total of the energy reflectance at the upper surface of the upper bubble 42 is 0.268, and the total of the energy reflectance at the lower surface of the upper bubble 42 is $(1-0.268) \times 0.047 = 0.034$. Accordingly, the total of the energy reflectance of the whole upper bubble 42 is the sum of the two, i.e., 0.302, as so described hereinabove.

Similarly, the energy reflectance of the lower bubble 42 is computed. The total of the energy reflectance at the upper face of the lower bubble 42 is $(1-0.302) \times 0.268 = 0.187$, and the total of the energy reflectance at the lower surface of the lower bubble 42 is $(1-0.302-0.187) \times 0.047 = 0.024$. Accordingly, the total of the energy reflectance of the whole lower bubble 42 is the sum of the two, i.e., 0.211.

After all, the total of the energy reflectance in the case where two bubbles 42 are aligned vertically is $0.302 + 0.211 = 0.513$. By introducing plural bubbles 42 into the hole 7 of the two-layered porous film 4, an effect of increasing the intensity of scattered and reflected light and bettering the image contrast can be obtained. When the number of the bubbles 42 in the holes 7 of the two-layered porous film 4 is further larger, then the total of the energy reflectance approaches 1 after repetition of the same computation, and the image contrast may be further bettered.

As described hereinabove, since the display apparatus 41, 51, 61 of the fourth, fifth and sixth embodiments employs the electroosmotic phenomenon for liquid driving therein, the problem of aggregation may be solved not using electrophoretic fine particles having a problem of aggregation. Since the hole 7 is closed, the problem of evaporation of the light transmitting liquid 8 can be solved, and the life of the apparatus can be thereby prolonged.

Utilizing the scattering reflection at the interface of the bubble 42 inside the two-layered porous film 4, black and white can be displayed in accordance with the position of the bubble 42, and an image of good contrast can be displayed.

In case where the mean hole diameter of the micro-holes 7 formed in the two-layered porous film 4, 24 is at most 100 μm, then the granular feeling of the image to be caused by the porous form of the film can be prevented even when the displayed image is seen near the apparatus.

In case where the mean hole diameter of the micro-holes 7 formed in the two-layered porous film 4, 24 is smaller than the thickness of the two-layered porous film 4, 24, then the apparatus may enjoy a sufficient light-absorption effect when the position of the bubble 42 is in the black part of the lower-layer black porous film 4b, therefore providing a sufficient image contrast with an increased degree of blackness.

When plural bubbles 42 are sealed up in one cylindrical micro-hole 7, then the degree of whiteness may further increase and a sufficient image contrast may be thereby obtained.

When the material of constituting the two-layered porous film 4, 24, and the upper substrate 3 and the lower substrate 2 contains an organic compound, when the upper electrode 6 and the lower electrode 5 disposed adjacent to the upper substrate 3 and the lower substrate 2 contain an electroconductive polymer and when the display apparatus 41, 51, 61 is constructed to be flexible as a whole, then flexible, paper-like display apparatuses can be realized.

When a color filter 12 of R/G/B is disposed on the upper substrate 3 adjacent to the light transmitting side of the two-layered porous film 4 so as to control the light scattering on the two-layered porous film 4, then the brightness of R/G/B can be controlled and the display apparatus 51 enables color displaying.

When the colored part side of the lower-layer colored porous film 24b of the two-layered porous film 24 is so designed as to have a micro-periodic color region structure of at least three colors and when the position for the light scattering at the two-layered porous film 24 is controlled, then the display apparatus 61 enables color displaying.

In the first to sixth embodiments, the two-layered porous film 4, 24 is used for the porous body and is divided into two parts each having different optical properties in the thickness direction thereof. However, the two-layered porous film 4, 24 may be divided into three or more different parts, or any other in which the light transmitting property thereof varies continuously may also be used for the porous body. The parts having different optical properties of the light transmitting liquid 8 may be formed not only by the fine particles 9, 29 or the bubbles 42 but also by an interface of immiscible liquids.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

According to the invention described hereinabove, the porous body contains at least a light transmitting part and its optical property varies in the thickness direction thereof, and therefore, when the position of the part of the liquid differing in optical property changes, then the combination of the optical property of the porous body around the hole and the optical property of the liquid in the hole varies, thereby bringing about visible change for displaying. The liquid is separately filled in each hole, as sealed up in a simple structure where the porous body is sandwiched between a pair of substrates, and is therefore sealed up in such small spaces, not lost through vaporization, and the liquid is prevented from being oxidized or from absorbing moisture. Accordingly, the apparatus enables stable display operation, and its life may be prolonged.

According to the invention, the liquid and the fine particles are sealed up inside the porous body, and therefore the fine particles and the liquid may be sealed up in such small spaces, therefore evading the problem of aggregation of electrophoretic fine particles, and the life of the apparatus may be thereby prolonged.

According to the invention, the light transmitting material of fine particles internally contain bubbles, and the bubbles are not lost, and the display based on the difference in refractivity at the interface between the light transmitting material and the bubbles can be stably attained.

According to the invention, electroosmotic flows may be generated in the liquid in the holes of the porous body by applying a voltage between the transparent electrode and the counter electrode, whereby the position of the bubbles is controlled and light is made to undergo irregular reflection/irregular refraction at the interface between the liquid and the bubbles for displaying by reflecting the difference in the optical property of the porous body near the position at which the bubbles exist. The bubbles and the liquid can be sealed up in small spaces in an extremely simple structure, and the problem of evaporation of the liquid can be evaded whereby the life of the apparatus can be prolonged.

According to the invention, the fine particles and the bubbles in the liquid in the holes may be positioned in the colored part of the porous body for color displaying.

According to the invention, a good contrast may be displayed by controlling the position of the white fine particles through voltage application thereto.

According to the invention, a good contrast may be displayed by controlling the position of the bubbles or the bubbles-containing fine particles through voltage application thereto.

According to the invention, the refractive index of the light transmitting part of the porous body and the liquid, and that of the light transmitting material of the bubbles-containing fine particles may be equivalent to each other, and therefore the light reflection and refraction at these interfaces may be reduced. Since the refractive index may be at least 1.3, the range of the incident angle for total reflection at the interface may be broadened, and the display contrast may be thereby increased.

According to the invention, the porous body may be produced by bonding a light transmitting layer and a colored layer followed by forming a large number of through-holes in the resulting structure.

According to the invention, cylindrical micro-through-holes may be uniformly formed by irradiation with ionic beams and chemical etching.

According to the invention, a large number of holes may exist in a region of the porous body that can be recognized as one pixel by human eyesight, therefore preventing a granular feeling of images to be caused by the porous form of the body.

According to the invention, color displaying may be attained by micro-displaying of three colors R, G and B.

According to the invention, the size of the fine particles and the bubbles in the liquid to be filled in the holes of the porous body may be smaller than the thickness of the porous body, and the position of the fine particles and the bubbles may be controlled by voltage, and therefore the difference in the optical property in the thickness direction of the porous body may be reflected in displaying.

According to the invention, since the liquid to be filled in each hole of the porous body may contain a plurality of the fine particles or the bubbles, the difference in the optical property in the thickness direction of the porous body may be more definitely reflected in displaying images of good contrast.

According to the invention, since the display apparatus is flexible as a whole, the display apparatus may be flexible and handled like paper-made documents.

According to the invention, the light-scattering in the porous body may be controlled in accordance with the position of the individual color of the color filter for displaying a color image as a whole.

The invention claimed is:

1. A display apparatus comprising:
   a sheet-form porous body which has plural holes dispersively formed to run through in a thickness direction thereof and has at least a light transmitting part to change its optical property in the thickness direction;
   a liquid filled in each of the holes of the porous body, which has a light transmitting part and a part differing from the light transmitting part in optical property, the part differing in optical property being capable of changing its position in the thickness direction through voltage application thereto;
   a pair of substrates of which at least one is transmissive of light and which hold the porous body on both sides thereof in the thickness direction so as to seal up the holes each filled with the liquid;
   a transparent electrode disposed on one side of the pair of substrates; and
   a counter electrode disposed on the other side of the pair of substrates, which enables electric field application to the liquid in the holes with the transparent electrode.

2. The display apparatus of claim 1, wherein the part of the liquid differing in optical property comprises fine particles dispersed in the liquid serving as a dispersant.

3. The display apparatus of claim 2, wherein the fine particles are formed of a light transmitting material internally containing at least one bubble.

4. The display apparatus of claim 3, when the position of the fine particles of bubbles-containing light transmitting material is set under field control so as to meet the light transmitting part of the porous body, then the optical path of the incident light to the light transmitting part is changed owing to the refractivity difference from the light transmitting material or the liquid at the interface of the bubbles, whereby the reflected light expresses white.

5. The display apparatus of claim 3, wherein the refractive index of the light transmitting part of the porous body is equivalent to that of the light transmitting material of bubbles-containing fine particles, and the refractive index is at least 1.3.

6. The display apparatus of claim 3, wherein the porous body has a colored part at least partly in the thickness direction thereof, and when the position of the bubbles is set under field control so as to meet a plurality of the position of the colored part, then the incident light to the light transmitting part is absorbed by the colored part, whereby the reflected light expresses coloration.

7. The display apparatus of claim 3, wherein the liquid to be filled in each hole of the porous body contains a plurality of the bubbles.

8. The display apparatus of claim 2, wherein the porous body has a colored part at least partly in the thickness direction thereof, and when the position of the fine particles is set under field control so as to meet the position of the colored part, then the incident light to the light transmitting part is absorbed by the colored part, whereby the reflected light expresses coloration.

9. The display apparatus of claim 2, wherein the fine particles are white fine particles, and when the position of the white fine particles is set under field control so as to meet the light transmitting part of the porous body, then the incident light to the light transmitting part is irregularly reflected on the surfaces of the white fine particles, whereby the reflected light expresses white.

10. The display apparatus of claim 2, wherein the liquid to be filled in each hole of the porous body contains a plurality of the fine particles.

11. The display apparatus of claim 1, wherein the part of the liquid differing in optical property comprises bubbles contained in the liquid.

12. The display apparatus of claim 11, when the position of the bubbles is set under field control so as to meet the light transmitting part of the porous body, then the optical path of the incident light to the light transmitting part is changed owing to the refractivity difference from the light transmitting material or the liquid at the interface of the bubbles, whereby the reflected light expresses white.

13. The display apparatus of claim 11, wherein the porous body has a colored part at least partly in the thickness direction thereof, and when the position of the bubbles is set under field control so as to meet the position of the colored part, then the incident light to the light transmitting part is absorbed by the colored part, whereby the reflected light expresses coloration.

14. The display apparatus of claim 11, wherein the liquid to be filled in each hole of the porous body contains the bubbles.

15. The display apparatus of claim 1, wherein the refractive index of the light transmitting part of the porous body is equivalent to that of the light transmitting part of the liquid, and the refractive index is at least 1.3.

16. The display apparatus of claim 1, wherein the porous body comprises two layers composed of a light transmitting layer in contact with one of the substrates and a colored layer in contact with the other of the substrates.

17. The display apparatus of claim 16, wherein the holes formed in the porous body have a cylindrical form, running through the body from the surface of the light transmitting layer to the surface of the colored layer.

18. The display apparatus of claim 17, wherein a mean diameter of the cylindrical form is at most 100 μm.

19. The display apparatus of claim 16, wherein the colored layer of the porous body has a colored pattern of at least three periodically-repeating colors.

20. The display apparatus one of claim 1, wherein a mean diameter of the plural holes formed in the porous body is smaller than the thickness of the porous body.

21. The display apparatus of claim 1, wherein the porous body and the pair of substrates contain an organic compound, the transparent electrode and the counter electrode contain an electroconductive polymer, and the apparatus is flexible as a whole.

22. The display apparatus of claim 1, wherein the light transmitting substrate on one side of the porous body is provided with a color filter.

23. The display apparatus of claim 1, wherein the porous body includes two layers, a first layer and a second layer in that order, where the first layer comprises the light transmitting layer and the second layer being composed so as to have a different optical property than the first layer and so that optical property of the porous body is changed in the thickness direction.

24. The display apparatus of claim 23, wherein the first layer is in contact with one of the pair of substrates and the second layer is in contact with the other of the pair of substrates.

* * * * *